(12) United States Patent
Suzuki et al.

(10) Patent No.: US 8,514,523 B2
(45) Date of Patent: Aug. 20, 2013

(54) FLEXIBLE-PRINTED-CIRCUIT VOICE-COIL ASSEMBLY CONFIGURED FOR INTEGRATION IN A VOICE-COIL MOTOR

(75) Inventors: Kenji Suzuki, Kanagawa (JP); Mutsuro Ohta, Kanagawa (JP); Takaaki Deguchi, Kanagawa (JP); Fu-Ying Huang, San Jose, CA (US); Shinsuke Nakagawa, Ibaraki (JP)

(73) Assignee: HGST Netherlands B.V., Amsterdam (NL)

( * ) Notice: Subject to any disclaimer, the term of this patent is extended or adjusted under 35 U.S.C. 154(b) by 51 days.

(21) Appl. No.: 13/193,831

(22) Filed: Jul. 29, 2011

(65) Prior Publication Data
US 2013/0027814 A1    Jan. 31, 2013

(51) Int. Cl.
*G11B 5/55* (2006.01)

(52) U.S. Cl.
USPC ........................................ 360/265; 360/264.2

(58) Field of Classification Search
USPC .............. 360/264.7, 264.8, 264.9, 265, 264.2
See application file for complete search history.

(56) References Cited

U.S. PATENT DOCUMENTS

| | | | | |
|---|---|---|---|---|
| 4,264,789 A | * | 4/1981 | Kaizu et al. | 381/408 |
| 4,728,390 A | * | 3/1988 | Yamamoto et al. | 216/48 |
| 5,099,162 A | * | 3/1992 | Sawada | 505/166 |
| 5,764,440 A | * | 6/1998 | Forbord | 360/265 |
| 6,040,650 A | * | 3/2000 | Rao | 310/268 |
| 6,104,581 A | * | 8/2000 | Huang et al. | 360/264.7 |
| 6,225,712 B1 | * | 5/2001 | Miyamoto et al. | 310/15 |
| 6,512,658 B1 | * | 1/2003 | Jierapipatanakul et al. | 360/264.7 |
| 6,633,457 B1 | * | 10/2003 | Lin et al. | 360/264.9 |
| 6,781,795 B2 | * | 8/2004 | Abe et al. | 360/264.2 |
| 6,816,343 B1 | * | 11/2004 | Oveyssi | 360/265 |
| 6,906,897 B1 | * | 6/2005 | Oveyssi | 360/265 |
| 6,922,305 B2 | | 7/2005 | Price | |
| 6,982,503 B1 | * | 1/2006 | Chew | 310/36 |
| 7,038,886 B1 | * | 5/2006 | Chang et al. | 360/264.7 |
| 7,095,595 B2 | * | 8/2006 | Shin | 360/266.3 |
| 7,262,939 B2 | * | 8/2007 | Hatchett et al. | 360/264.8 |
| 7,298,592 B2 | * | 11/2007 | Lee et al. | 360/265 |
| 7,424,774 B2 | * | 9/2008 | Hashimoto | 29/603.04 |
| 7,457,429 B2 | * | 11/2008 | Stiles | 381/414 |
| 7,474,511 B2 | * | 1/2009 | Scheglmann et al. | 360/265 |
| 7,576,954 B2 | | 8/2009 | Wei et al. | |
| 7,652,849 B2 | * | 1/2010 | Nozaki et al. | 360/264.2 |
| 7,675,714 B1 | | 3/2010 | Yucesan et al. | |

(Continued)

FOREIGN PATENT DOCUMENTS

| | | | |
|---|---|---|---|
| JP | 63215296 A | * | 9/1988 |
| JP | 2005327407 | | 11/2005 |

OTHER PUBLICATIONS

Suzuki, et al., "VCM Design With Round Coil and Axe-Shaped Magnet for Hard Disk Drive Actuator", *Microsystem Technologies*, vol. 13, Issue 8-10, (Apr. 2007),1093-1101.

*Primary Examiner* — Brian Miller

(57) ABSTRACT

A flexible-printed-circuit (FPC) voice-coil assembly configured for integration in a voice-coil motor. The FPC voice-coil assembly includes at least one FPC voice coil. The FPC voice coil includes a coil including at least one coil turn, and a flexible substrate. The flexible substrate is coupled to the coil to form a flexible printed circuit. The FPC voice coil is configured for integration in a voice-coil motor. A voice-coil motor and a disk drive including the FPC voice-coil assembly are also provided.

13 Claims, 13 Drawing Sheets

(56) References Cited

U.S. PATENT DOCUMENTS

| | | | | |
|---|---|---|---|---|
| 7,848,058 B2 * | 12/2010 | Huang et al. | | 360/265.8 |
| 8,031,439 B2 * | 10/2011 | Lee | | 360/264.7 |
| 8,305,714 B2 * | 11/2012 | Suzuki et al. | | 360/265 |
| 2003/0179503 A1 * | 9/2003 | Choi | | 360/265 |
| 2008/0291563 A1 | 11/2008 | Obregon et al. | | |
| 2008/0310054 A1 | 12/2008 | Fu et al. | | |
| 2009/0015968 A1 | 1/2009 | Xu et al. | | |
| 2009/0046392 A1 | 2/2009 | Xu et al. | | |
| 2009/0190266 A1 | 7/2009 | Shimizu et al. | | |

* cited by examiner

FLEXIBLE-PRINTED-CIRCUIT VOICE-COIL ASSEMBLY CONFIGURED FOR INTEGRATION IN A VOICE-COIL MOTOR

TECHNICAL FIELD

Embodiments of the present invention relate generally to the field of disk drives, and voice-coil motors (VCMs) and rotary actuators of disk drives.

BACKGROUND

Disk drives are known in the art that use various kinds of disks, such as: optical disks, magneto-optical disks, flexible magnetic-recording disks, and similar disks of data-storage devices. In particular, hard-disk drives (HDDs) have been widely used as indispensable data-storage devices for computer systems. Moreover, HDDs have found widespread application to motion picture recording and reproducing apparatuses, car navigation systems, cellular phones, and similar devices, in addition to the computers, because of their outstanding information-storage characteristics.

In standard HDDs, a rotary actuator having a magnetic-recording head mounted at one end is driven in rotation about a pivot shaft of the rotary actuator; and, by this means, the magnetic-recording head can be positioned at any radial position over a magnetic-recording disk so that writing data to, and reading data from, the magnetic-recording disk can be performed. A voice coil is mounted at the other end of the rotary actuator, and the drive force for rotating the rotary actuator is produced by means of a voice-coil motor (VCM), which includes a VCM magnet that is secured to the disk enclosure (DE) of the HDD. The VCM has a structure in which the voice coil is disposed between yokes made of a soft magnetic material in order to form a magnet for generating magnetic flux and a magnetic circuit.

Against the background of the "information society", in which there is a need for greater information-storage capacity in HDDs, attempts are being made to improve the positioning accuracy of magnetic-recording heads and to produce HDDs which are able to record at higher areal density by reducing vibration excitation forces inside HDDs and attenuating disturbances, which have larger affects as the control bandwidth of the rotary actuator increases with the demand for higher areal density. Conventional mechanisms for positioning rotary actuators are those in which the magnetic-recording head at the distal end of the rotary actuator is driven in rotation and placed in a specific position by applying a voice-coil current to the voice coil of the VCM. Increases in the control bandwidth in head positioning systems involving a VCM has been achieved by making the rotary actuator more rigid, which increases the main resonance frequency, because the control bandwidth stems largely from the main resonance frequency of the rotary actuator. However, even larger increases in the control bandwidth are difficult to achieve by further increasing the rigidity of the rotary actuator. Therefore, efforts have been made to reduce the phase lag produced by the filter of the hard-disk controller (HDC) for attenuating resonance in order to maintain stable control, by reducing out-of-plane structural resonance, such as torsional resonance and bending resonance. In view of this, structures for attenuating structural resonance have been proposed in the art, as next described.

In a first example known in the art, a structure for minimizing track-positioning errors of the magnetic-recording head that are caused by dynamic mechanical deformation of the HDD suspension and magnetic-recording head provides an attenuation mechanism on the voice coil and voice-coil support part. However, the HDD including the attenuation mechanism on the voice coil and voice-coil support part does not include a structure which reduces the actual excitation force of the resonance in the VCM.

In a second example known in the art, a HDD includes two voice coils in parallel in the lengthwise direction of the rotary actuator, and includes a VCM that does not induce main resonance that adversely affects the increase in control bandwidth. In the track following mode for positioning the magnetic-recording head at a specific track on the magnetic-recording disk, current is applied to the second voice coil; while in the track seek mode for moving the magnetic-recording head to a specific track, current is applied to the first voice coil. Moreover, the two voice coils are not parallel to the pivot shaft of the rotary actuator, and current is only applied to one of the voice coils in each of the two modes.

In a third example known in the art, in order to increase the bandwidth of the rotary actuator in a HDD, the HDD may employ two modes, namely a track following mode for positioning the magnetic-recording head and a track seek mode for moving to a specific track; and, the voltage is divided between two voice coils during track following for positioning the magnetic-recording head, such that the main resonance frequency that adversely affects increases in control bandwidth is not excited. The orientations of the currents applied to the two voice coils in the track following mode are opposing, and therefore the rotational moment generated per unit current is reduced, and a large current is required, which leads to increased electrical power consumption.

These designs suggest that engineers and scientists engaged in HDD manufacturing and development have an on-going interest in the design of HDDs that control the motion of the rotary actuator that bears the magnetic-recording head in accessing data written to, and read back from, the magnetic-recording disk to meet the rising demands of the marketplace for increased data-storage capacity, performance, and reliability of HDDs.

SUMMARY

Embodiments of the present invention include a flexible-printed-circuit (FPC) voice-coil assembly configured for integration in a VCM. The FPC voice-coil assembly includes at least one FPC voice coil. The FPC voice coil includes a coil including at least one coil turn, and a flexible substrate. The flexible substrate is coupled to the coil to form a flexible-printed circuit. The FPC voice coil is configured for integration in a VCM. Embodiments of the present invention also include a VCM and a disk drive including the FPC voice-coil assembly.

DESCRIPTION OF THE DRAWINGS

The accompanying drawings, which are incorporated in and form a part of this specification, illustrate embodiments of the invention and, together with the description, serve to explain the embodiments of the invention.

Figure 1:
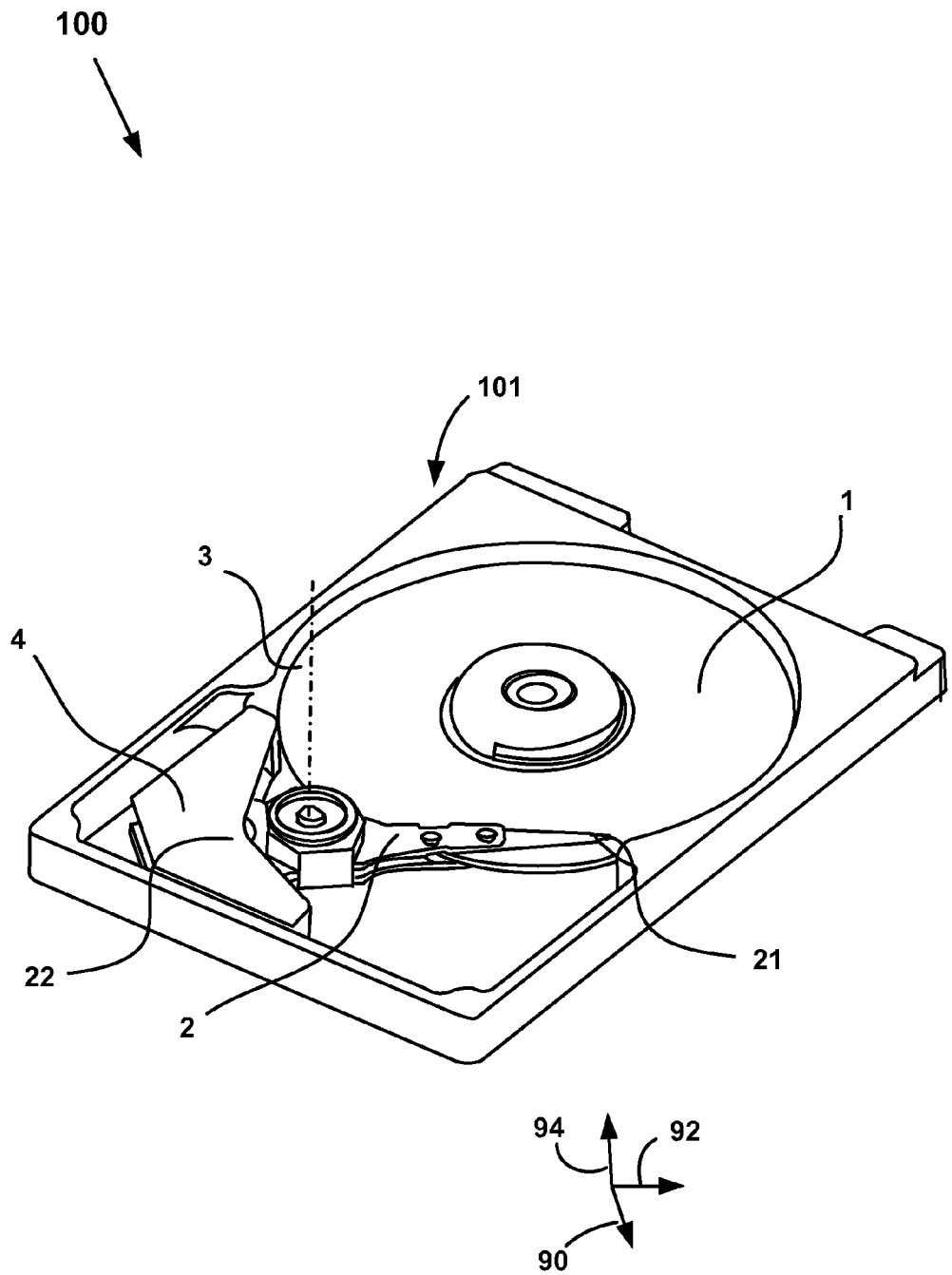
FIG. 1 is a perspective view of a hard-disk drive (HDD), in accordance with one or more embodiments of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary.
Physical Description of Embodiments of the Present Invention for a Flexible-Printed-Circuit Voice-Coil Assembly Configured for Integration in a Voice-Coil Motor With relevance to embodiments of the present invention, the voice-coil motor (VCM), ideally, generates only a force that causes rotation of the rotary actuator. However, a force parallel to the pivot shaft may be generated because of the structure, shape, and assembly variations of the VCM. The force parallel to the pivot shaft acts in a direction perpendicular to the movement plane of the voice coil; and, therefore, the force parallel to the pivot shaft is referred to by the term of art, "out-of-plane excitation force." The out-of-plane excitation force is produced when there is a component in the magnetic field emanating from the VCM magnet that is parallel to the plane in which a voice coil lies. The out-of-plane excitation force has the greatest effect at the outer peripheral portion of the voice coil, which is distal from the pivot shaft that constitutes the rotational center of the rotary actuator. The out-of-plane excitation force generates torque at the center of rotation of the rotary actuator. This torque constitutes a source of noise as the resonant frequency, which is associated with bending resonance and torsional resonance of the coils, matches the resonant frequency of the base and cover; and, this torque causes settling vibration in the rotary actuator, which may be communicated to the magnetic-recording head coupled to the actuator. The settling vibration of the rotary actuator leads to impaired performance of the hard-disk drive (HDD), such that the positioning accuracy of the magnetic-recording head is impaired, which presents an obstacle to increasing the data-storage capacity of the HDD.

Embodiments of the present invention provide stable positioning of the magnetic-recording head with reduced noise and settling vibration, by providing a system with suppression of the excitation of structural resonance, such as out-of-plane torsion and bending of the rotary actuator, due to the out-of-plane excitation force exerted on the coils of the VCM in the HDD. Thus, embodiments of the present invention provide a large, data-storage capacity HDD in which the out-of-plane excitation force acting on voice coils is reduced, and the positioning accuracy of the magnetic-recording head on a specific recording track is increased by suppressing the bending resonance and torsional resonance of the coils, and consequently vibration of the magnetic-recording head.

In accordance with embodiments of the present invention, a voice-coil assembly of a VCM, which is the drive source of a rotary actuator for positioning a magnetic-recording head that writes data to, and reads data from, the recording surface of a magnetic-recording disk, includes a flexible-printed-circuit (FPC) voice coil and at least a second voice coil. In accordance with embodiments of the present invention, the coil axes of the FPC voice coil and the second voice coil are disposed parallel to the pivot shaft of the rotary actuator. In accordance with embodiments of the present invention, the orientations of the currents that are applied to the first and second coils are about the same; but, the magnitudes of current in the first and second coils are in different proportions such that out-of-plane structural resonances, namely torsion and bending of the rotary actuator, are reduced. Thus, embodiments of the present invention reduce the excitation of out-of-plane structural resonance, namely torsion and bending, which is produced by the out-of-plane excitation force generated in the coils of the VCM in a HDD. Thus, embodiments of the present invention provide a HDD in which noise and settling vibration can be reduced, and in which the magnetic-recording head can be stably positioned.

With reference now to FIG. 1, in accordance with embodiments of the present invention, a perspective view 100 showing an example embodiment of HDD 101 is shown. In the subsequent description of HDD 101, rotary actuator 2 and VCM 4, embodiments of the present invention incorporate within the environments of HDD 101, rotary actuator 2 and VCM 4, without limitation thereto, the subsequently described embodiments of the present invention for a FPC voice-coil assembly 24 (FIGS. 2-4 and 6-9) including at least one FPC voice coil, and the subsequently described embodiments of the present invention for a voice-coil assembly 22 including the FPC voice coil 22-1 and a second voice coil 22-2, which are suitable for incorporation within the environments of HDD 101, rotary actuator 2 and VCM 4. Moreover, HDD 101 is but one representative environment for embodiments of the present invention, as embodiments of the present invention also encompass within their spirit and scope other types of disk drives, for example, such as: optical drives that include one or more optical disks, magneto-optical drives that include one or more magneto-optical disks, floppy-disk drives that include one or more flexible magnetic-recording disks, and similar disk data-storage devices. Thus, embodiments of the present invention described in terms of a magnetic-recording head 21 and a magnetic-recording disk 1 may also apply more generally to other types of heads and disks used in disk drives, more generally; and, the embodiments of the present invention described in terms of a hard-disk controller (HDC) may also apply more generally to other types of disk controllers for such disk drives. Furthermore, although FPC voice-coil assembly 24 (FIG. 2), rotary actuator 2 and VCM 4 are shown in the environment of HDD 101, this is by way of example without limitation thereto, as other embodiments of the present invention encompass within their spirit and scope FPC voice-coil assemblies (FIG. 2), rotary actuators and VCMs that may be used in other types of disk drives, for example, those listed above.

With further reference to FIG. 1, in accordance with embodiments of the present invention, HDD 101 includes at least one head-gimbal assembly (HGA) including a magnetic-recording head 21, a lead-suspension attached to the magnetic-recording head 21, and a load beam attached to a slider, which includes the magnetic-recording head 21 at a distal end of the slider; the slider is attached at the distal end of the load beam to a gimbal portion of the load beam. HDD 101 also includes at least one magnetic-recording disk 1 rotatably mounted on a spindle and a drive motor (not shown) mounted in a disk-enclosure (DE) base and attached to the spindle for rotating the magnetic-recording disk 1. The magnetic-recording head 21 that includes a write element, a so-called writer, and a read element, a so-called reader, is disposed for respectively writing and reading information, referred to by the term of art, "data," stored on the magnetic-recording disk 1 of HDD 101. The magnetic-recording disk 1, or a plurality (not shown) of magnetic-recording disks, may be affixed to the spindle by a disk clamp. HDD 101 further includes: a rotary actuator 2 that is coupled with the HGA and includes a carriage 2-1 (FIG. 2); a VCM 4 that includes a voice-coil assembly 22, which is integrated with the rotary actuator 2 through attachment to the carriage 2-1 (FIG. 2), and the VCM magnets 42-1 and 42-2 (FIGS. 8 and 9); the VCM 4 is configured to move the rotary actuator 2 and HGA to access portions of the magnetic-recording disk 1, as the carriage 2-1 (FIG. 2) of the rotary actuator 2 is mounted on a pivot shaft 3 with an interposed pivot-bearing assembly. As used herein, "access" is a term of art that refers to operations in seeking a data track of a magnetic-recording disk and positioning a magnetic-recording head on the data track for both reading data from, and writing data to, a magnetic-recording disk. HDD 101 may also include a load-unload ramp for the HGA that is configured to engage a tongue of the HGA at the far distal end of HGA when rotary actuator 2 is retracted from a position for flying the magnetic-recording head 21 in proximity with the magnetic-recording disk 1.

With further reference to FIG. 1, in accordance with embodiments of the present invention, a triad of vectors 90, 92 and 94 is provided. The triad of vectors 90, 92 and 94 is right handed. The triad of vectors 90, 92 and 94 provides a reference for determining the orientation of other drawings of embodiments of the present invention with respect to FIG. 1. The terms of art, "bottom" and "top," refer to structures and sides of structures that are oriented perpendicular to vector 94; "bottom" refers to sides facing the DE base, or structures disposed below the center plane of HDD 101 that is parallel to the plane of the magnetic-recording disk 1; and "top", to sides facing the DE cover (not shown), or structures disposed above the center plane of HDD 101. The term of art, "upward" refers to entities aligned in the same direction and sense of the vector 94; and, the term of art, "downward" to entities aligned in the opposite direction and sense of the vector 94. The term of art, "vertical" refers to entities aligned parallel to the vector 94; and, the term of art, "horizontal" to entities aligned perpendicular to the vector 94. The vector 92 is oriented parallel to a center line of the rotary actuator 2; and, the term of art "distal" refers to structures located at the end of the rotary actuator 2 where the magnetic-recording head 21 is located; and, "proximal", to the end of the rotary actuator 2 opposite the distal end, for example, to where the voice-coil assembly 22 is located. The vector 90 is oriented orthogonally to vectors 92 and 94; and, the term of art "right" refers to the right of the center line of the rotary actuator 2 when viewed in the positive direction of vector 92 when moving away from the center line in the positive direction of vector 90; and, the term of art "left" refers to the left of the center line of the rotary actuator 2 when viewed in the positive direction of vector 92 when moving away from the center line in the direction opposite to the positive direction of vector 90.

Figure 2:
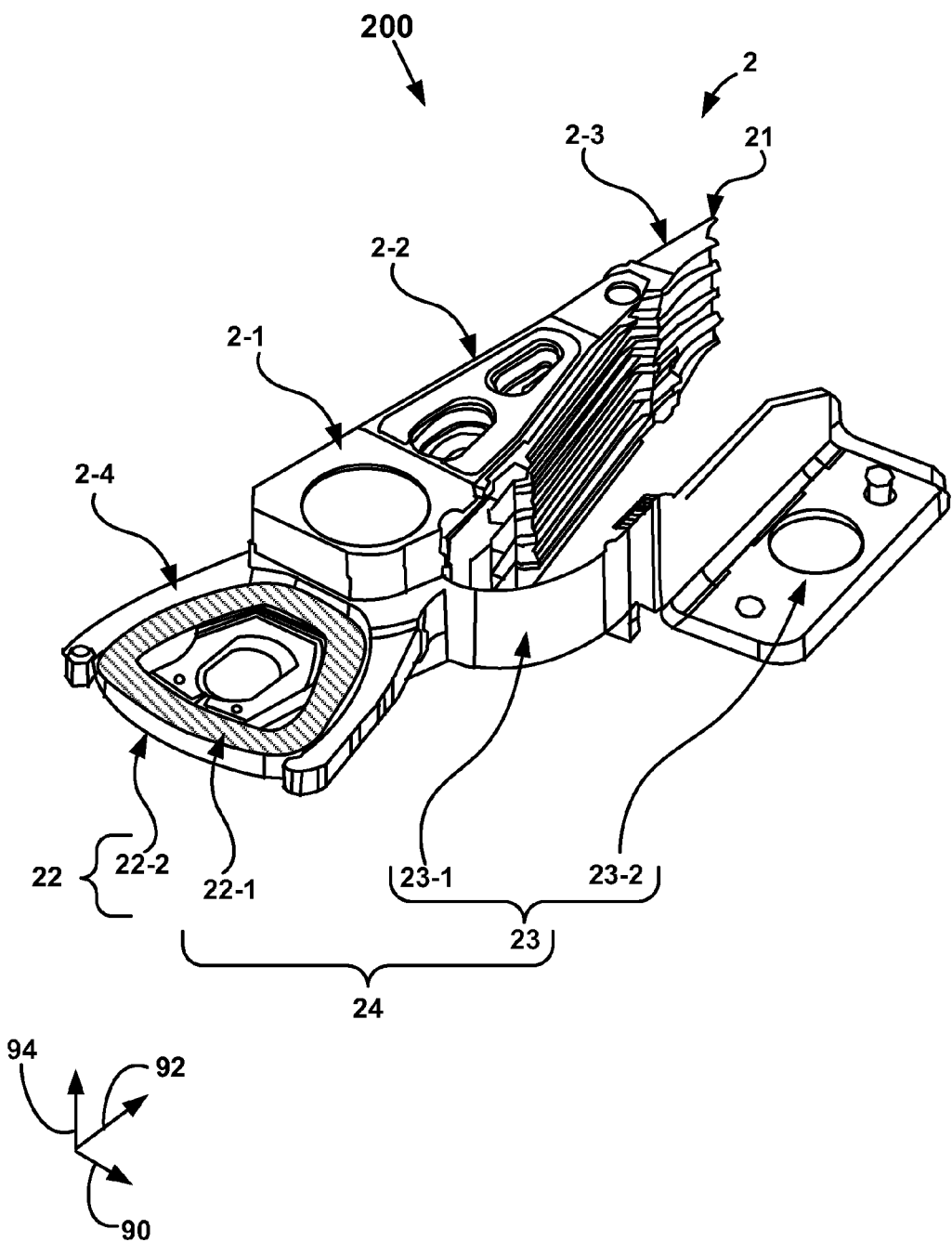
FIG. 2 is a perspective view of a rotary actuator of a hard-disk drive (HDD) including a flexible-printed-circuit (FPC) voice-coil assembly, in accordance with one or more embodiments of the present invention.

With further reference to FIG. 1, in accordance with embodiments of the present invention, electrical signals, for example, voice-coil currents supplied to the voice-coil assembly 22 of VCM 4, write signals to and read signals from the magnetic-recording head 21, are provided by a flexible cable 23 (FIG. 2). Interconnection between the flexible cable 23 and the magnetic-recording head 21 may be provided by an arm-electronics (AE) module, which may have an on-board pre-amplifier for the read signal, as well as other read-channel and write-channel electronic components. The flexible cable 23 is coupled to an electrical-connector block, which provides electrical communication through electrical feedthroughs provided by the DE base. The DE base, also referred to as a casting, depending upon whether the DE base is cast, in conjunction with a DE cover (not shown in FIG. 1) provides a sealed, protective disk enclosure (DE) for the information storage components of HDD 101.

With further reference to FIG. 1, in accordance with embodiments of the present invention, other electronic components (not shown), including a hard-disk controller (HDC)/ microprocessor unit (MPU) and servo electronics including a digital-signal processor (DSP), provide electrical signals to the drive motor, the voice-coil assembly 22 of VCM 4 and the magnetic-recording head 21. The electrical signal provided to the drive motor enables the drive motor to spin providing a torque to the spindle which is in turn transmitted to the magnetic-recording disk 1 that is affixed to the spindle by the disk clamp; as a result, the magnetic-recording disk 1 spins. The spinning magnetic-recording disk 1 creates an airflow including an air-stream, and a cushion of air that acts as an air bearing on which the air-bearing surface (ABS) of the slider rides so that the slider flies in proximity with the surface of the magnetic-recording disk 1 with minimal contact between the slider and the magnetic-recording disk 1 in which information is recorded. The electrical signal provided to the voice-coil assembly 22 of VCM 4 enables the magnetic-recording head 21 to access a track on which information is recorded. Thus, the rotary actuator 2 swings through an arc which enables magnetic-recording head 21 to access various tracks on the magnetic-recording disk 1. Information is stored on the magnetic-recording disk 1 in a plurality of concentric tracks (not shown) arranged in sectors on the magnetic-recording disk 1. Correspondingly, each track is composed of a plurality of sectored track portions. Each sectored track portion is composed of recorded data and a header containing a servo-burst-signal pattern, for example, an ABCD-servo-burst-signal pattern, information that identifies a track, and error correction code information. In accessing the track, the read element of the magnetic-recording head 21 of the HGA reads the servo-burst-signal pattern which provides a position-error-signal (PES) to the servo electronics, which controls the electrical signal provided to the voice-coil assembly 22 of VCM 4, enabling the magnetic-recording head 21 to follow the track. Upon finding the track and identifying a particular sectored track portion, the magnetic-recording head 21 either reads data from the track, or writes data to, the track depending on instructions received by the HDC from an external agent, for example, a microprocessor of a computer system.

With reference now to FIG. 2, in accordance with embodiments of the present invention, a perspective view 200 is shown of the rotary actuator 2 of the HDD 101. As shown in FIG. 2, the rotary actuator 2 includes the FPC voice-coil assembly 24. Triad of vectors 90, 92 and 94 indicates the orientation of the perspective view 200 with respect to the perspective view 100 of FIG. 1. As shown in FIG. 2, the rotary actuator includes a carriage 2-1, at least one arm 2-2, at least one head-suspension assembly (HSA) 2-3, a yoke 2-4, and a voice-coil assembly 22. Yoke 2-4 is a mechanical structure for communicating the forces exerted on the voice coils to the carriage 2-1 of the rotary actuator 2, not to be confused with the yoke of the VCM 4, which provides a magnetic flux path for the magnetic flux emanating from the VCM magnets. In accordance with embodiments of the present invention, the voice-coil assembly 22 includes at least a FPC voice-coil 22-1, which may also be referred to herein as a first voice coil, and at least a second voice coil 22-2. The second voice coil 22-2 is disposed in close proximity to the FPC voice coil 22-1. The FPC voice coil 22-1 may be disposed as a laminate coupled with a first side of the second voice coil 22-2. Thus, since the FPC voice coil 22-1 is fabricated in the form of a flexible sheet, the FPC voice coil is suitable for attachment to the second voice coil 22-2 by means of an adhesive binder, by way of example without limitation thereto. By way of example, the adhesive binder may be provided as an adhesive backing on the side of the FPC voice coil 22-1 that is attached to the first side of the second voice coil 22-2. The first side lies about perpendicular to an axis about which turns of the second voice coil 22-2 are wound. The axis about which turns of the second voice coil 22-2 are wound, referred to herein as the winding axis, lies about parallel to the axis of the pivot shaft 3. As shown in FIG. 2, by way of example, the first side is the top side of the second voice coil 22-2. However, the first side may be a bottom side of the second voice coil 22-2. As used herein, the second side of the second voice coil 22-2 is the side of the second voice coil 22-2 that is opposite to the first side, so that if the first side of the second voice coil 22-2 is the top side of the second voice coil 22-2 the second side is the bottom side of the second voice coil 22-2, and if the first side of the second voice coil 22-2 is the bottom side of the second voice coil 22-2 the second side is the top side of the second voice coil 22-2.

With further reference to FIG. 2, in accordance with embodiments of the present invention, the rotary actuator 2 is attached to a flexible cable 23, which provides power to the coils of the voice-coil assembly 22, as well as signals to and from the magnetic-recording head 21 that is disposed at the distal end of the HSA 2-3, which is also referred to herein as the distal end of the rotary actuator 2. The flexible cable 23 includes a flexible portion 23-1, which is a flexible-printed circuit (FPC), and a bracket 23-2, which interfaces with the electrical-connector block to sources of electrical power and signals outside of the disk enclosure (DE). In accordance with embodiments of the present invention, the HDD 101 includes the FPC voice-coil assembly 24. In accordance with embodiments of the present invention, the FPC voice-coil assembly 24 may include both the FPC voice coil 22-1 and the flexible cable 23. By way of example, the FPC voice-coil assembly 24 may include the FPC voice coil 22-1 and the flexible cable 23 as discrete and separate component parts, which are physically interconnected with one another upon attachment to the rest of the actuator assembly. Alternatively, by way of example without limitation thereto, the FPC voice-coil assembly 24 may include the FPC voice coil 22-1 and the flexible cable 23 as fully integrated component parts of a prefabricated flexible-printed circuit (FPC), examples of which are subsequently described.

Figure 3:
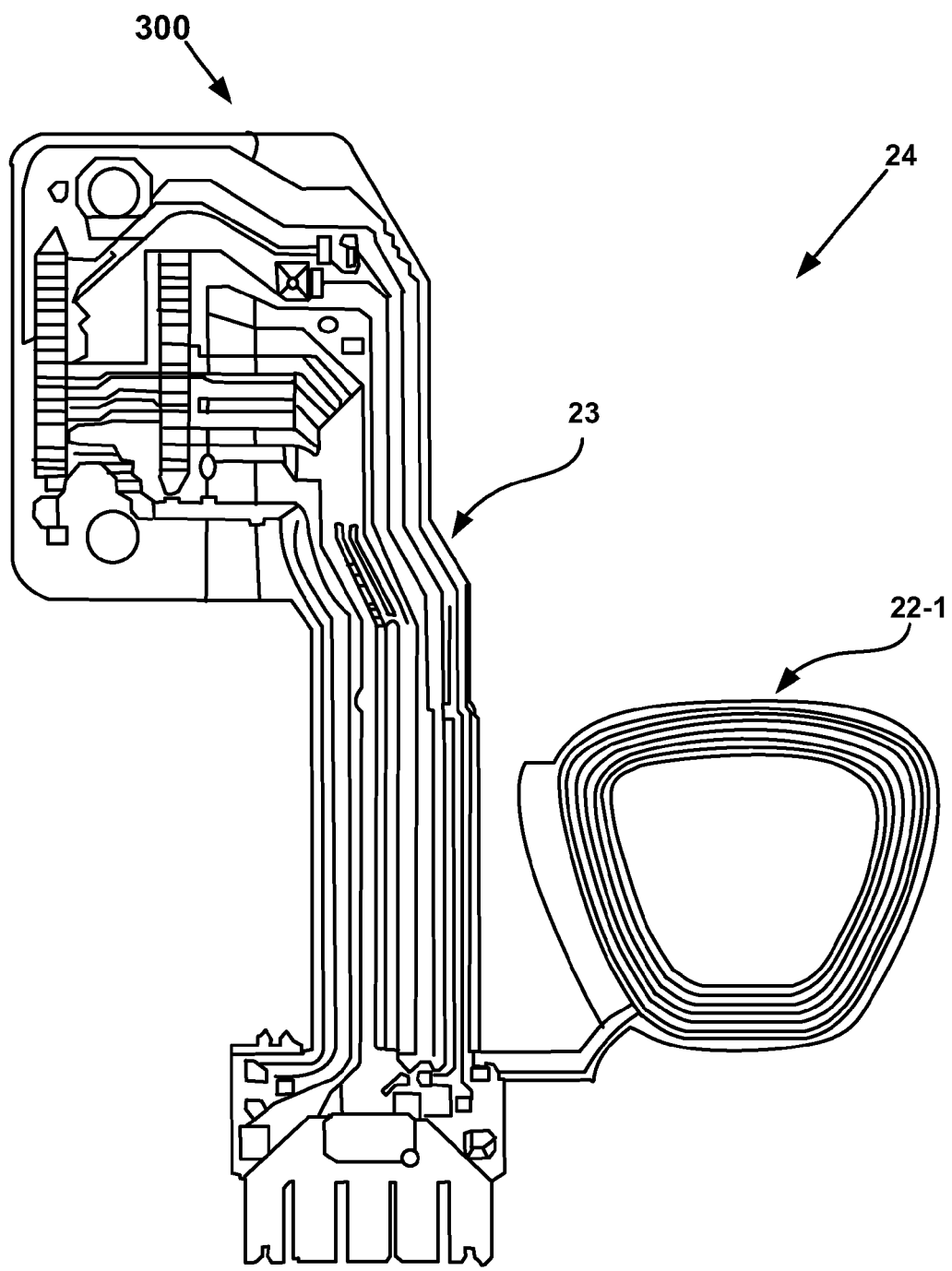
FIG. 3 is a plan view of an example FPC voice-coil assembly including a flexible cable, in accordance with one or more embodiments of the present invention.

With reference now to FIG. 3, in accordance with embodiments of the present invention, a plan view 300 of an example FPC voice-coil assembly 24 is shown that includes, by way of example without limitation thereto, the flexible cable 23. The FPC voice-coil assembly 24 is configured for integration in the VCM 4. The FPC voice-coil assembly 24 includes at least one FPC voice coil 22-1. The FPC voice coil 22-1 includes a coil that includes at least one coil turn 22-1*t* (FIG. 4), and a flexible substrate coupled to the coil to form a flexible-printed circuit (FPC). The flexible substrate may be composed of any of a number of suitable electrically insulating polymeric substrate materials, for example, polyimide. By way of example, the flexible substrate may be the same flexible substrate upon which the flexible portion 23-1 of the flexible cable 23 is fabricated, such that both the FPC voice coil 22-1 and the flexible portion 23-1 of the flexible cable 23 are integrated into a flexible-printed circuit (FPC) assembly, without limitation thereto. The FPC voice coil 22-1 is configured for integration in the VCM 4 of the HDD 101. The FPC voice-coil assembly 24 is configurable to reduce vibrations of the magnetic-recording head 21 when data is accessed on the magnetic-recording disk 1 in HDD 101 when integrated in the VCM 4. By way of example without limitation thereto, the FPC voice-coil assembly 24 may further include the flexible cable 23. The flexible cable 23 may be coupled with the FPC voice coil 22-1. For example, as shown in FIG. 3, the flexible cable 23 is interconnected with the FPC voice coil through a pair of conductive leads that provide an electrical current to the FPC voice coil 22-1. Also within the scope of embodiments of the present invention for the FPC voice-coil assembly 24, a form and a shape of the FPC voice coil 22-1 in a plane of the FPC voice coil 22-1 may be substantially identical to a form and a shape of the second voice coil 22-2 of the VCM 4 in a plane of the second voice coil 22-2. Moreover, the form and the shape of the FPC voice coil 22-1 may be that of a trapezoidal flattened annulus. Thus, the FPC voice coil 22-1 may underlay the second voice coil 22-2 at the bottom of the second voice coil 22-2. Alternatively, the shape and form of the FPC voice coil 22-1 is suitable for overlaying the FPC voice coil 22-1 on the top of the second voice coil 22-2, as is next described.

Figure 4:
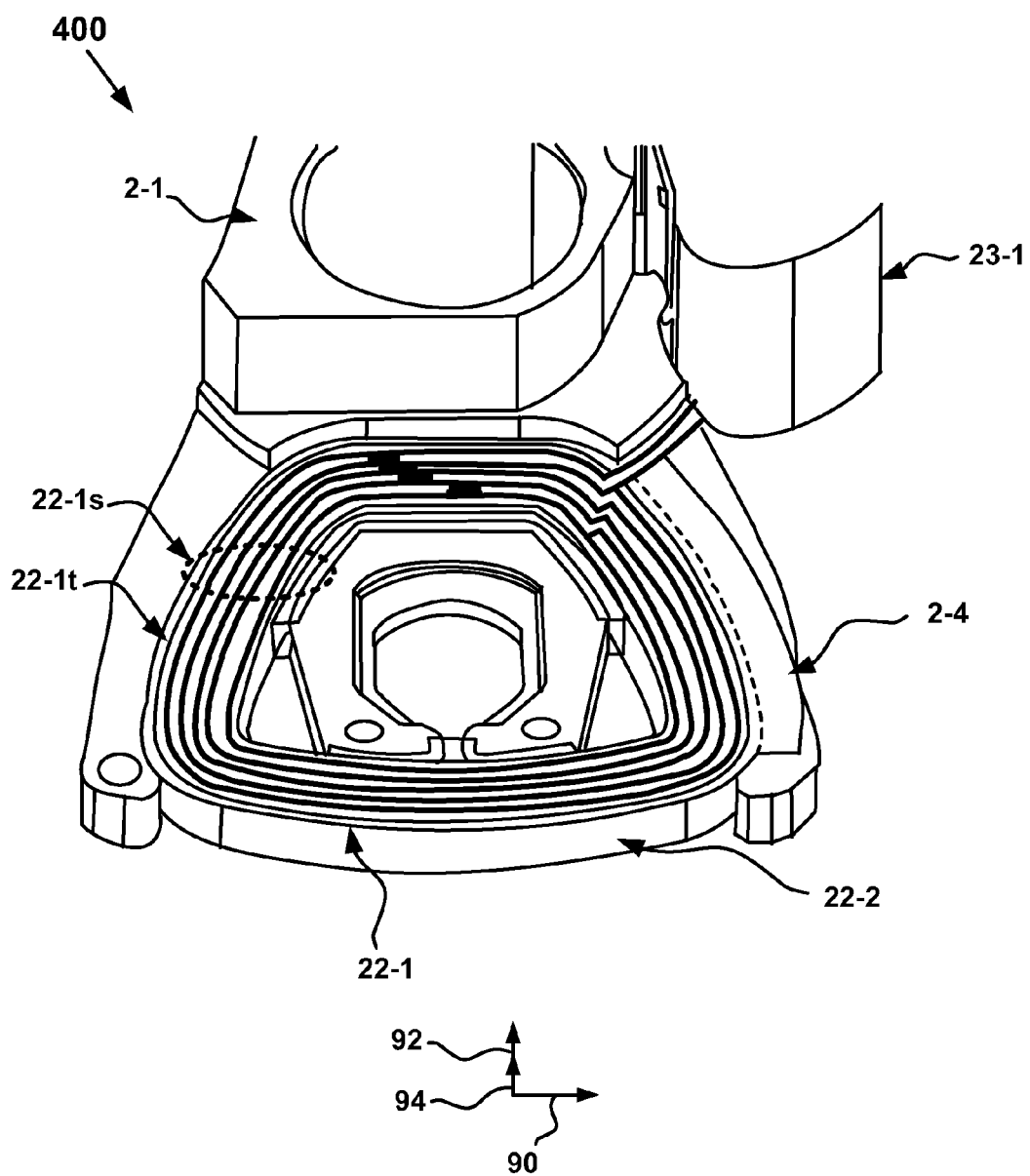
FIG. 4 is a perspective view of the proximal end of the rotary actuator of FIG. 2 detailing the example FPC voice-coil assembly of FIG. 3, in accordance with one or more embodiments of the present invention.
Figure 7:
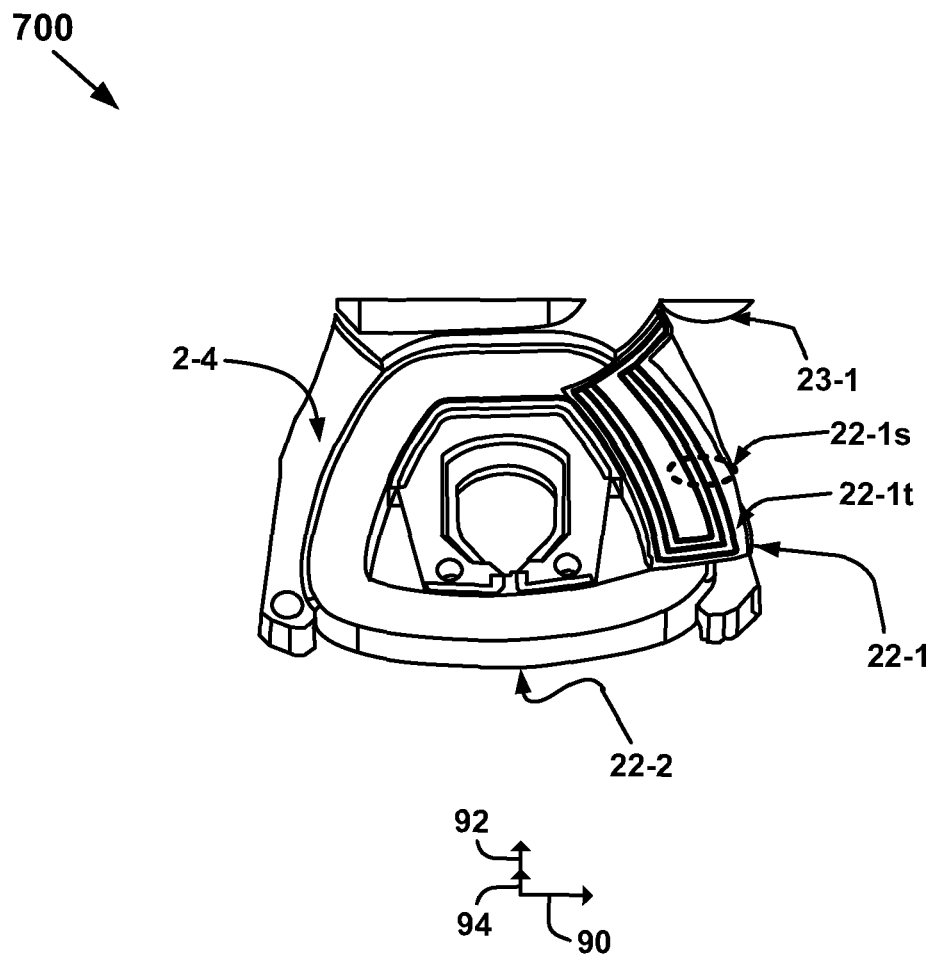
FIG. 7 is a perspective view of a proximal end of a rotary actuator detailing the example FPC voice-coil assembly of FIG. 6, in accordance with one or more embodiments of the present invention.

With reference now to FIG. 4, in accordance with embodiments of the present invention, a perspective view 400 is shown of the proximal end of the rotary actuator of FIG. 2. Triad of vectors 90, 92 and 94 indicates the orientation of the perspective view 400 with respect to the perspective view 100 of FIG. 1. FIG. 4 details the example FPC voice-coil assembly 24 of FIG. 3 for an embodiment of the present invention, by way of example without limitation thereto, in which the FPC voice-coil 22-1 overlays the entirety of the second voice coil 22-2, such that all four legs (FIGS. 5A and 5B) of the second voice coil 22-2 are covered by the FPC voice coil 22-1. As shown in FIG. 4, the coil of the FPC voice coil 22-1 may further include a plurality of coil turns 22-1s. The plurality of coil turns 22-1s includes at least one coil turn 22-1t, by way of example without limitation thereto. Also within the scope of embodiments of the present invention for the FPC voice-coil assembly 24, at least some of the coil turns 22-1s of the plurality of coil turns 22-1s may be connected in series electrically. Thus, the coil turns may be arranged in a spiral about the axis around which the coil turns are wound, in a configuration referred to figuratively as a "spiral pan-cake coil." Alternatively, at least some of the coil turns 22-1s of the plurality of coil turns 22-1s may be connected in parallel electrically. Thus, the coil turns may be arranged as a plurality of concentric turns disposed about the axis around which the coil turns are wound, in a configuration that may be referred to figuratively as a "nested race-track coil." Thus, in accordance with embodiments of the present invention, the FPC voice coil 22-1 may be a planar coil having all the turns of the coil on the same plane, also referred to herein as a "sheet coil." In the case of the nested race-track coil configuration, common terminals are provided at the both the beginning and end of each turn of the nested race-track coil; one example of common terminals is shown in FIG. 7 for an alternative example of a FPC voice coil 22-1.

Figure 5A:
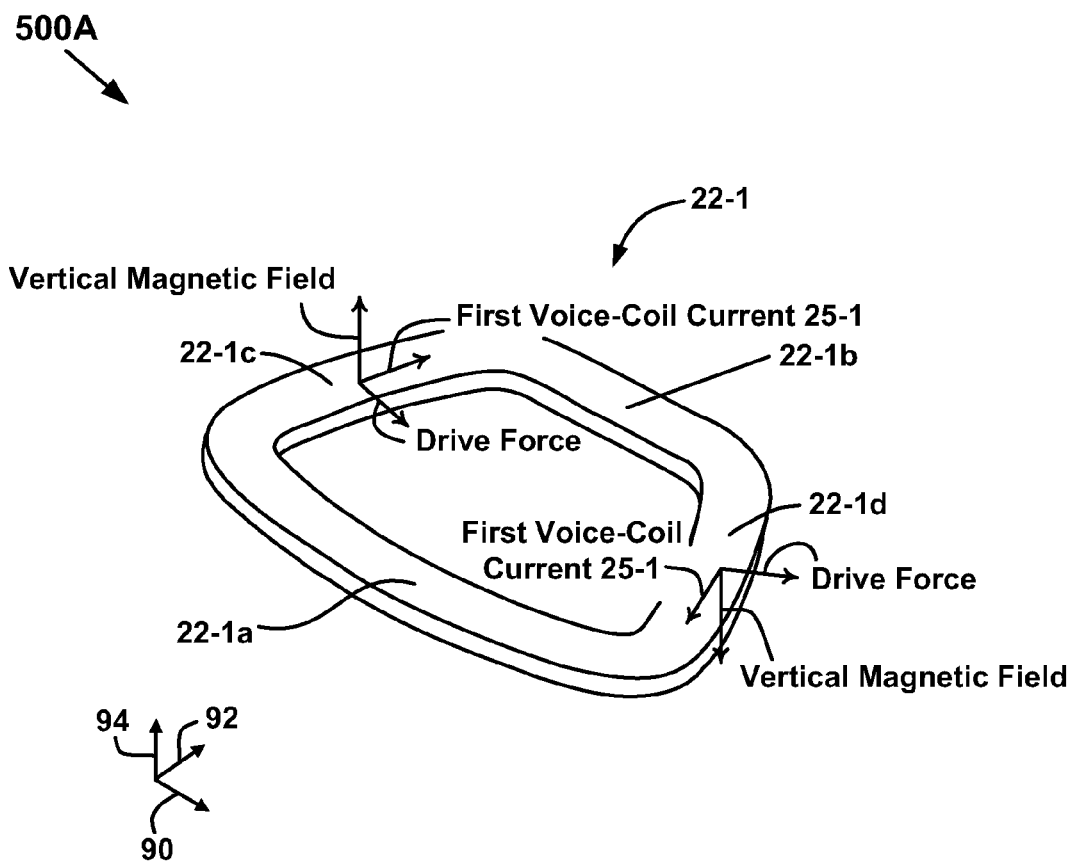
FIG. 5A is a perspective view of a FPC voice coil, shown as a first voice coil, of the HDD of FIG. 1, in accordance with one or more embodiments of the present invention.
Figure 5B:
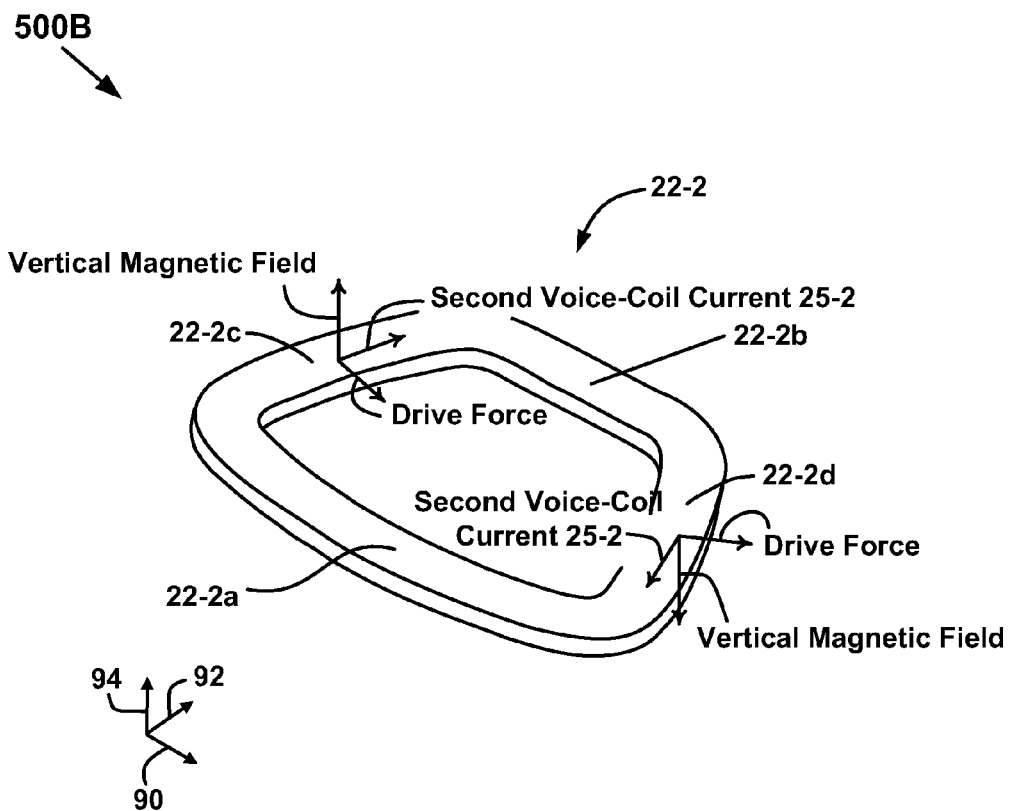
FIG. 5B is a perspective view of a second voice coil of the HDD of FIG. 1, in accordance with one or more embodiments of the present invention.
Figure 8:
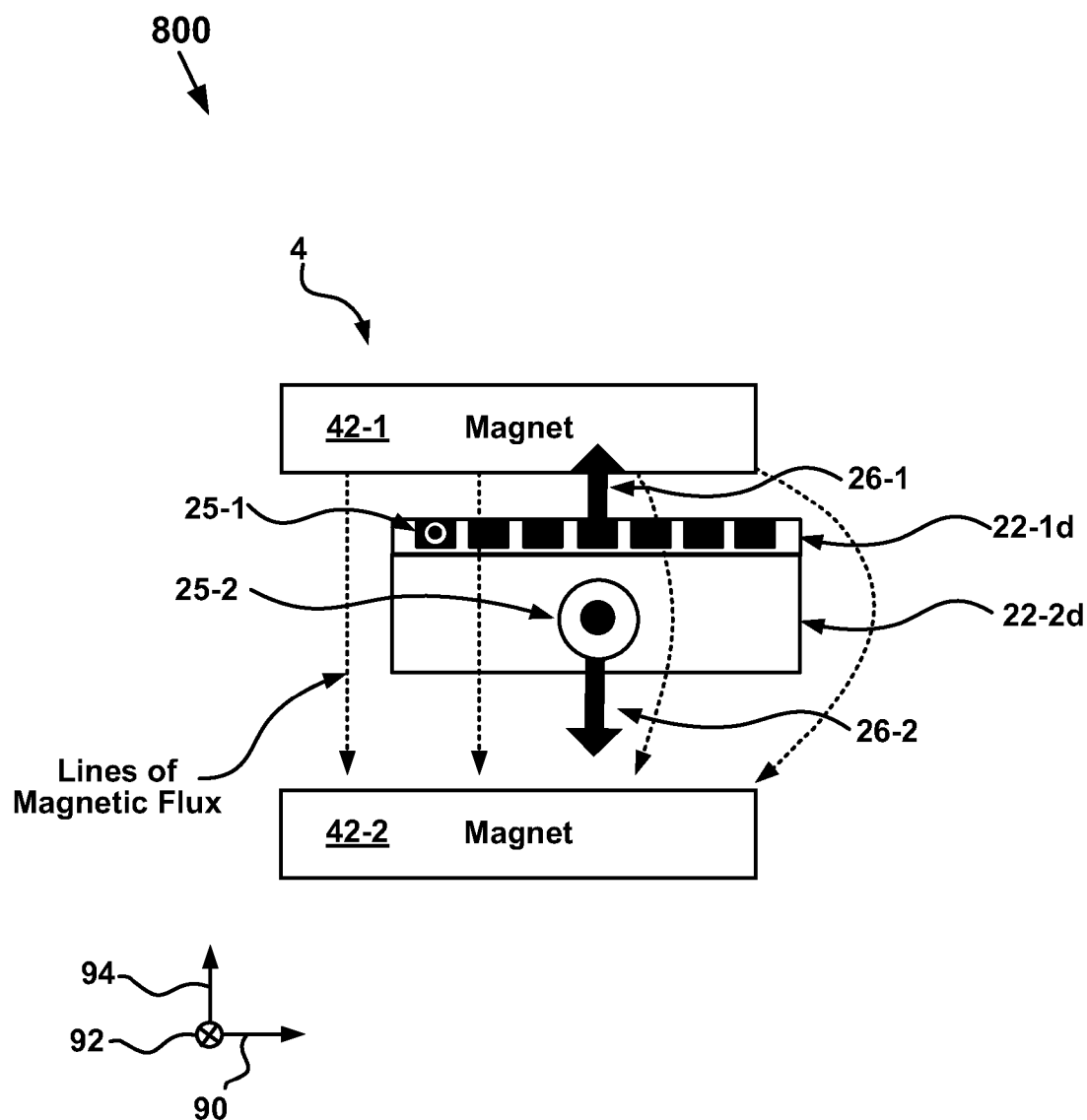
FIG. 8 is a cross-sectional elevation view of a voice-coil motor (VCM) including the FPC voice coil and the second voice coil of FIGS. 5A and 5B, respectively, of a voice-coil assembly, and first and second VCM magnets, showing out-of-plane excitation forces exerted on the FPC voice coil and the second voice coil that null out one another, in accordance with one or more embodiments of the present invention.

With reference now to FIGS. 5A, 5B and 8 and further reference to FIG. 1 embodiments of the present invention encompass within their scope, a disk drive, for example, HDD 101, that includes: at least one head, for example, magnetic-recording head 21; at least one disk, for example, magnetic-recording disk 1, rotatably mounted in the disk drive; a rotary actuator 2 coupled with the head at a distal end of the rotary actuator 2; and, a VCM 4. In accordance with embodiments of the present invention, the VCM 4 includes at least one VCM magnet, for example, one of VCM magnets 42-1 and 42-2 (FIG. 8), and a voice-coil assembly 22. In accordance with embodiments of the present invention, the voice-coil assembly 22 is disposed in proximity to a magnetic pole of a VCM magnet, for example, one of VCM magnets 42-1 and 42-2 (FIG. 8), and is disposed at a proximal end of the rotary actuator 2 opposite to the distal end, where the head is disposed. In accordance with embodiments of the present invention, the rotary actuator 2 may include the voice-coil assembly 22. In accordance with embodiments of the present invention, the voice-coil assembly 22 includes a FPC voice coil 22-1 and at least a second voice coil 22-2, without limitation thereto. The FPC voice-coil assembly 24 includes at least one FPC voice coil 22-1. The FPC voice coil 22-1 includes a coil including at least one coil turn 22-1t, and a flexible substrate. The flexible substrate is coupled to the coil to form a flexible printed circuit. By way of example without limitation thereto, FPC voice-coil assembly 24 may also include the flexible cable 23. The flexible cable 23 is coupled with the FPC voice coil 22-1 and is configured to provide electrical current flow to at least one FPC voice coil 22-1 of the FPC voice-coil assembly 24. Thus, in accordance with other embodiments of the present invention, a voice-coil assembly may also further include a plurality of voice coils including the FPC voice coil 22-1, the second voice coil 22-2, a third voice coil, for example, a second FPC voice coil 22-3 (FIG. 9), and at least a fourth voice coil (not shown); the plurality of voice coils may be similarly configured to embodiments of the present invention for the FPC voice coil 22-1 and the second voice coil 22-2, described herein, to reduce vibrations of the magnetic-recording head 21 when data is accessed on the magnetic-recording disk 1 in the HDD 101. The FPC voice coil 22-1 is disposed in proximity to a magnetic pole of the at least one voice-coil-motor magnet. The second voice coil 22-2 is disposed in close proximity to the FPC voice coil 22-1 such that the FPC voice coil 22-1 may substantially overlay the second voice coil 22-2 (FIGS. 8 and 10). By way of example without limitation thereto, the FPC voice coil 22-1 may be disposed as a laminate coupled with a first side of the second voice coil 22-2; and, the first side is about perpendicular to an axis about which turns of the second voice coil 22-2 are wound. In accordance with embodiments of the present invention, the rotary actuator 2 is configured to move the head, for example, magnetic-recording head 21, to access portions of the disk, for example, magnetic-recording disk 1, for writing data to, and reading data from, the disk. The FPC voice coil 22-1 and the second voice coil 22-2 are disposed at a proximal end of the rotary actuator 2 opposite to the distal end. In accordance with embodiments of the present invention, the FPC voice coil 22-1 and the second voice coil 22-2 are configured to reduce vibrations of the head, for example, magnetic-recording head 21, when data is accessed on a disk, for example, magnetic-recording disk 1, in the disk drive, for example, HDD 101. As described above, embodiments of the present invention include within their spirit and scope: a disk drive, for example, HDD 101; a head, for example, magnetic-recording head 21; a disk, for example, magnetic-recording disk 1; and, a disk controller, for example, a hard-disk controller (HDC).

With reference now to FIGS. 5A and 5B, in accordance with embodiments of the present invention, perspective views 500A and 500B are shown of the FPC voice coil 22-1, shown as a first voice coil, and the second voice coil 22-2, respectively, of HDD 101. Triad of vectors 90, 92 and 94 indicates the orientation of the perspective view 200A with respect to the perspective view 100 of FIG. 1. As shown in FIGS. 5A and 5B, the portions of the FPC voice coil 22-1 and the second voice coil 22-2 that are parallel to the direction of rotation of the rotary actuator 2 about the pivot shaft 3 and further from the pivot shaft 3 are referred to as an outer peripheral portion 22-1a of the FPC voice coil 22-1 and an outer peripheral portion 22-2a and of the second voice coil 22-2, respectively. As such, the outer peripheral portion 22-1a of the FPC voice coil 22-1 and the outer peripheral portion 22-2a and of the second voice coil 22-2 constitute respective legs of the FPC voice coil 22-1 and the second voice coil 22-2. Furthermore, the portions of the FPC voice coil 22-1 and the second voice coil 22-2 that are parallel to the direction of rotation of the rotary actuator 2 about the pivot shaft 3 and are close to the pivot shaft 3 are referred to as an inner peripheral portion 22-1b of the FPC voice coil 22-1 and an inner peripheral portion 22-2b and of the second voice coil 22-2, respectively. As such, the inner peripheral portion 22-1b of the FPC voice coil 22-1 and the inner peripheral portion 22-2b and of the second voice coil 22-2 also constitute respective legs of the FPC voice coil 22-1 and the second voice coil 22-2. Furthermore, the two straight line portions of the FPC voice coil 22-1 that are substantially perpendicular to the direction of rotation of the rotary actuator 2 about the pivot shaft 3 are referred to below as a left straight-line portion 22-1c and a right straight-line portion 22-1d of the FPC voice coil 22-1; and, the two straight line portions of the second voice coil 22-2 that are substantially perpendicular to the direction of rotation of the rotary actuator 2 about the pivot shaft 3 are referred to below as a left straight-line portion 22-2c and a right straight-line portion 22-2d of the second voice coil 22-2. Similarly, the left straight-line portion 22-1c and the right straight-line portion 22-1d of the FPC voice coil 22-1 also constitute legs of the FPC voice coil 22-1; and, the left straight-line portion 22-2c and the right straight-line portion 22-2d of the second voice coil 22-2 similarly constitute legs of the second voice coil 22-2.

With further reference to FIGS. 5A and 5B, in accordance with embodiments of the present invention, the turns of the FPC voice coil 22-1 are wound about a first voice-coil axis; and, turns of the second voice coil 22-2 are wound about a second voice-coil axis; the first voice-coil axis and the second voice-coil axis may be disposed about parallel to the pivot shaft 3 of the rotary actuator 2 upon assembly, and/or during operation, of HDD 101. The FPC voice coil 22-1 and the second voice coil 22-2 may be described by the term of art, "pancake coil," because the turns of the FPC voice coil 22-1 and the second voice coil 22-2 are disposed in a nearly planar configuration about the voice-coil axes; and, therefore, the term of art "plane of the voice coil," refers to a plane perpendicular to the voice-coil axis and near which the turns of a voice coil are disposed. Similarly, the terms of art, "in-plane," and "out-of-plane," refer to vectors, for example, drive forces, lying about in the plane of a voice coil, and vectors, for example, out-of-plane excitation forces, oriented about perpendicular to the plane of a voice coil, respectively. Moreover, the outer peripheral portion, the inner peripheral portion, the right straight-line portion and the left straight-line portion are disposed about along the sides of a trapezoid, as shown in FIGS. 5A and 5B, except for slight arcuate curvature of these portions in the plane of the voice coil. Therefore, in accordance with embodiments of the present invention, a form and a shape of the FPC voice coil 22-1 and the second voice coil 22-2 is that of a trapezoidal flattened annulus. Although the form and the shape of the second voice coil 22-2 in the plane of the second voice coil 22-2 are substantially identical to the form and the shape of the FPC voice coil 22-1 in the plane of the FPC voice coil 22-1, the FPC voice coil 22-1 may be flatter than the second voice coil 22-2, because all the turns of the FPC voice coil 22-1 lie in the same plane, unlike the second voice coil 22-2 which may have turns closely stacked on successive planes in a flattened structure. However, the FPC voice coil 22-1 may be figuratively referred to as a top half of the voice-coil assembly 22; and, the second voice coil 22-2, as a bottom half of the voice-coil assembly 22. Thus, although the thicknesses of the FPC voice coil 22-1 and the second voice coil 22-2 are shown as about the same for purposes of illustration in FIGS. 5A and 5B, as well as FIGS. 10 and 11, the thicknesses of the FPC voice coil 22-1 and the second voice coil 22-2 may not be the same.

Figure 6:
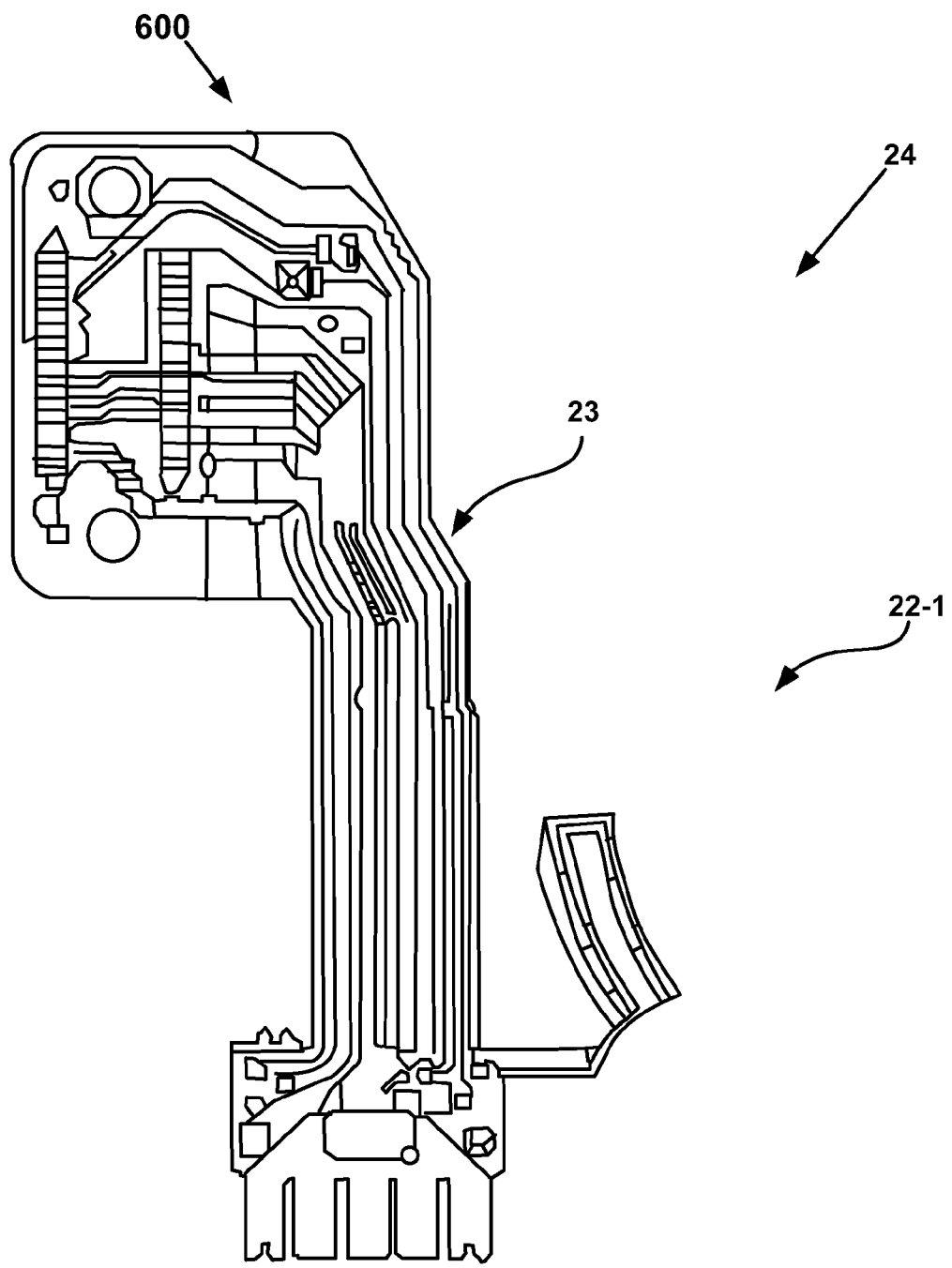
FIG. 6 is a plan view of an alternative example FPC voice-coil assembly including a flexible cable, in accordance with one or more embodiments of the present invention.

With reference now to FIG. 6, in accordance with embodiments of the present invention, a plan view 600 is shown of an alternative example FPC voice-coil assembly 24 that includes, by way of example without limitation thereto, a flexible cable 23. The flexible cable 23 may be coupled with the FPC voice coil 22-1. For example, as shown in FIG. 6, the flexible cable 23 is interconnected with the FPC voice coil 22-1 through a pair of conductive leads that provide an electrical current to the FPC voice coil 22-1. Also within the scope of embodiments of the present invention for the FPC voice-coil assembly 24, a form and a shape of the FPC voice coil 22-1 in the plane of the FPC voice coil 22-1 may be substantially identical to a form and a shape of a single leg of the second voice coil 22-2 of the VCM 4 in the plane of the second voice coil 22-2. Moreover, the form and the shape of the FPC voice coil 22-1 will be determined by the leg of the second voice coil 22-2 with which the FPC voice coil 22-1 is laminated. Thus, the FPC voice coil 22-1 may underlay a leg of the second voice coil 22-2 at the bottom of the second voice coil 22-2. Alternatively, the shape and form of the FPC voice coil 22-1 is suitable for overlaying a leg of the FPC voice coil 22-1 on the top of the second voice coil 22-2, as is next described.

With reference now to FIG. 7, in accordance with embodiments of the present invention, a perspective view 700 is shown of a proximal end of a rotary actuator 2. Triad of vectors 90, 92 and 94 indicates the orientation of the perspective view 700 with respect to the perspective view 100 of FIG. 1. FIG. 7 details the example FPC voice-coil assembly 24 of FIG. 6 for an embodiment of the present invention, by way of example without limitation thereto, in which the FPC voice-coil 22-1 overlays a single leg, the right straight-line portion 22-1d (FIG. 5A), of the second voice coil 22-2, which is covered by the FPC voice coil 22-1. In accordance with embodiments of the present invention, the FPC voice coil 22-1 may be configured to overlay a portion of at least one leg of the second voice coil 22-2 of the VCM 4, as shown. Alternatively, the FPC voice coil 22-1 may be configured to underlay a portion of at least one leg of the second voice coil 22-2 of the VCM 4. As shown in FIG. 7, the coil of the FPC voice coil 22-1 may further include a plurality of coil turns 22-1s. The plurality of coil turns 22-1s includes at least one coil turn 22-1t, by way of example without limitation thereto. Also within the scope of embodiments of the present invention for the FPC voice-coil assembly 24, by way of example, the coil turns 22-1s of the plurality of coil turns 22-1s may be connected in parallel electrically, as shown in FIG. 7, without limitation thereto. Thus, as shown in FIG. 7, the coil turns may be arranged as a plurality of concentric turns disposed about the axis around which the coil turns are wound, in the configuration described earlier as a "nested race-track coil." In the case of the nested race-track coil configuration, common terminals are provided at the both the beginning and end of each turn of the nested race-track coil (FIG. 7). In accordance with embodiments of the present invention, the FPC voice coil 22-1 is configurable to suppress a torsional structural resonance of a voice-coil assembly 22 when data is accessed on a magnetic-recording disk 1 in the HDD 101 when integrated in the VCM 4, which is subsequently described in greater detail.

With further reference to FIGS. 5A, 5B and 8, in accordance with embodiments of the present invention, the principle of operation of the VCM 4 is illustrated by which the voice-coil assembly 22 is moved by a drive force generated by interaction of currents flowing through the FPC voice coil 22-1 and the second voice coil 22-2 of the voice-coil assembly 22 with a magnetic field bridging the space between the VCM magnets 42-1 and 42-2 (FIG. 8). In one embodiment of the present invention, the currents flowing in FPC voice coil 22-1 and the second voice coil 22-2 flow in the same sense around their respective voice coils 22-1 and 22-2, as proportionate portions of a total VCM current. As used herein, the VCM current includes the first voice-coil current 25-1 and second voice-coil current 25-2; and, the VCM current may equal the sum of the first voice-coil current 25-1 and second voice-coil current 25-2, without limitation thereto. A clockwise, or alternatively counter-clockwise, direction of the voice-coil currents 25-1 and 25-2 causes the actuator to move in one direction, or alternatively, in an opposite direction, respectively. As a first voice-coil current 25-1 flows through the turns of the FPC voice coil 22-1, interaction of the first voice-coil current 25-1 with the vertical magnetic field bridging the space between the VCM magnets 42-1 and 42-2 generates a drive force on the FPC voice coil 22-1, which is proportional to the number of turns of the FPC voice coil 22-1, the first voice-coil current 25-1 and the vertical magnetic field produced by VCM magnets 42-1 and 42-2. Similarly, as a second voice-coil current 25-2 flows through the turns of the second voice coil 22-2, interaction of the second voice-coil current 25-2 with the vertical magnetic field bridging the space between the VCM magnets 42-1 and 42-2 generates a drive force on the second voice coil 22-2, which is proportional to the number of turns of the second voice coil 22-2, the second voice-coil current 25-2 and the vertical magnetic field produced by VCM magnets 42-1 and 42-2. However, if the magnetic field has a horizontal component, the current flowing in the portion of the coil lying in proximity to the horizontal component of the magnetic field produces an out-of-plane excitation force that is exerted on that portion of the coil, which is next described.

With reference now to FIG. 8, in accordance with embodiments of the present invention, a cross-sectional elevation view 800 of a portion of the VCM 4 is shown. A portion of the VCM 4 is shown with only a single pair of legs of the voice-coil assembly 22, for example, the legs corresponding to the right straight-line portions 22-1d and 22-2d (FIGS. 5A and 5B). Triad of vectors 90, 92 and 94 indicates the orientation of the cross-sectional elevation view 800 with respect to the perspective view 100 of FIG. 1. In accordance with embodiments of the present invention, VCM 4 includes at least one VCM magnet, for example, one of VCM magnets 42-1 and 42-2, and the voice-coil assembly 22. FIG. 8 also shows out-of-plane excitation forces 26-1 and 26-2 exerted on the FPC voice coil 22-1 and the second voice coil 22-2, respectively, that may null out one another, in accordance with one or more embodiments of the present invention, to reduce torsion and bending of the voice coil assembly 22 located at the proximal end of the rotary actuator 2. The voice-coil assembly 22 includes the FPC voice coil 22-1 and the second voice coil 22-2. The FPC voice coil 22-1 is disposed in proximity to a magnetic pole of at least one voice-coil-motor magnet, for example, VCM magnet 42-1. The second voice coil 22-2 is disposed in close proximity to the FPC voice coil 22-1 such that the FPC voice coil 22-1 substantially overlays the second voice coil 22-2. The FPC voice coil 22-1 and the second voice coil 22-2 are configured to reduce vibrations of the magnetic-recording head 21 when data is accessed on the magnetic-recording disk 1 in HDD 101.

With further reference to FIG. 8, in accordance with embodiments of the present invention, magnetic flux associated with the vertical magnetic fields produced by the VCM magnets 42-1 and 42-2 is shown as dashed vertical arrows directed from the VCM magnets 42-1 and 42-2. The VCM 4 may also be provided with a yoke (not shown) to which the VCM magnets 42-1 and 42-2 are coupled to complete a magnetic circuit. Moreover, the symbols "X" and "dot" shown in FIG. 8 denote tail and head, respectively, of vectors, which for vectors lying in the FPC voice coil 22-1 and the second voice coil 22-2 refer to the directions of the first voice-coil current 25-1 and the second voice-coil current 25-2 flowing in the FPC voice coil 22-1 and the second voice coil 22-2, respectively, of the voice-coil assembly 22.

With further reference to FIG. 8, with relevance for embodiments of the present invention, in a VCM including VCM magnets disposed above and below voice coils, respectively, if the neutral plane of the voice-coil assembly coincides with the magnetic center of the VCM, the out-of-plane excitation force exerted on the first and second voice coils may be reduced. However, as shown in FIG. 8, in the absence of further embodiments of the present invention subsequently described, out-of-plane excitation forces may be exerted on the FPC voice coil 22-1 and the second voice coil 22-2. If the neutral plane of the voice-coil assembly 22 does not coincide with the magnetic center of the VCM 4, because of variations in assembly of HDD 101 and rotary actuator 2, out-of-plane excitation forces may be exerted on the FPC voice coil 22-1 and the second voice coil 22-2. As shown in FIG. 8, a horizontal component of the magnetic field at the right side of the VCM 4 produces an upward out-of-plane excitation force 26-1 on the right straight-line portion 22-1d of the FPC voice coil 22-1, and produces a downward out-of-plane excitation force 26-2 on the right straight-line portion 22-2d of the second voice coil 22-2. Since the magnetic center of the VCM 4 does not coincide with the neutral plane of the voice-coil assembly 22, the sum of upward out-of-plane excitation force on the right straight-line portion 22-1d of the FPC voice coil 22-1 and the downward out-of-plane excitation force on the right straight-line portion 22-2d of the second voice coil 22-2 may produce a net force acting on both the FPC voice coil 22-1 and the second voice coil 22-2 in a direction about parallel to the axes of the FPC voice coil 22-1 and the second voice coil 22-2, which is in the vertical direction of vector 94. Consequently, an out-of-plane moment may be exerted on the FPC voice coil 22-1 and the second voice coil 22-2; and, the VCM current may excite out-of-plane structural resonances, such as bending and torsion, which result in deleterious vibration of the magnetic-recording head 21. The VCM 4 may no longer maintain stable control. In addition, the force which excites out-of-plane structural resonance in the range of movement of the FPC voice coil 22-1 and the second voice coil 22-2 varies; and, therefore, excitation of resonance may occur throughout the whole range of movement of the FPC voice coil 22-1 and the second voice coil 22-2.

On the other hand, with further reference to FIG. 8, in accordance with embodiments of the present invention, the FPC voice coil 22-1 and the second voice coil 22-2 may be configured as shown, such that if a first voice-coil current 25-1 applied to the FPC voice coil 22-1 produces an upward out-of-plane excitation force 26-1 on the right straight-line portion 22-1d of the FPC voice coil 22-1, a greater second voice-coil current 25-2 may be applied to the second voice coil 22-2 to increase a downward out-of-plane excitation force 26-2 on the right straight-line portion 22-2d of the second voice coil 22-2 to nullify the effect of upward out-of-plane excitation force 26-1 on the right straight-line portion 22-1d of the FPC voice coil 22-1. Thus, in accordance with embodiments of the present invention, the sum of the component of force acting on the FPC voice coil 22-1 and the component of force acting on second voice coil 22-2 is reduced in the direction about parallel to the axes of the FPC voice coil 22-1 and the second voice coil 22-2, which is the vertical direction of vector 94, without limitation thereto. Consequently, an out-of-plane moment is not produced in the FPC voice coil 22-1 and the second voice coil 22-2; and, the VCM current does not excite out-of-plane structural resonances, such as bending and torsion. Thus, in accordance with embodiments of the present invention, the VCM 4 maintains stable control. In addition, the net force which previously excited out-of-plane structural resonance in the range of movement of the FPC voice coil 22-1 and the second voice coil 22-2 can be nullified; and, therefore, excitation of resonance is suppressed throughout the whole range of movement of the FPC voice coil 22-1 and the second voice coil 22-2. However, the preceding discussion addressed only out-of-plane excitation forces associated with horizontal components in the magnetic field of the VCM 4 encountered upon motion of the voice-coil assembly 22 along the direction of vector 90, from left-to-right, or alternatively, from right-to-left. However, horizontal components in the magnetic field of the VCM 4 are also present at the inner peripheral and the outer peripheral portions of the voice-coil assembly 22, for example, the outer peripheral portion 22-1a and of the FPC voice coil 22-1 and the outer peripheral portion 22-2a and of the second voice coil 22-2, as well as the inner peripheral portion 22-1b and of the FPC voice coil 22-1 and the inner peripheral portion 22-2b and of the second voice coil 22-2, the effects of which are subsequently described.

Figure 9:
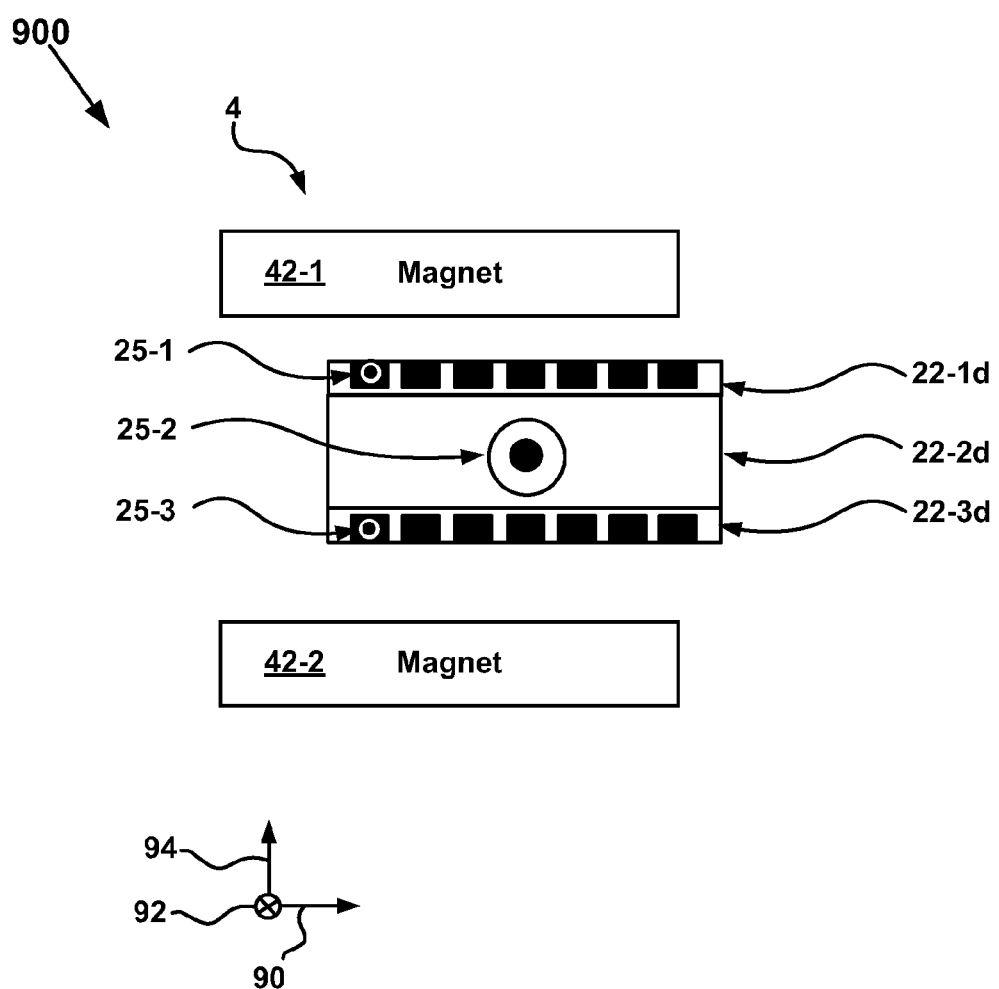
FIG. 9 is a cross-sectional elevation view of an alternative example VCM that includes a FPC voice coil, a second voice coil and a second FPC voice coil of a voice-coil assembly, and first and second VCM magnets, which shows the FPC voice coil disposed on top of the second voice coil and the second FPC voice coil disposed on the bottom of the second voice coil, in accordance with one or more embodiments of the present invention.
Figure 10:
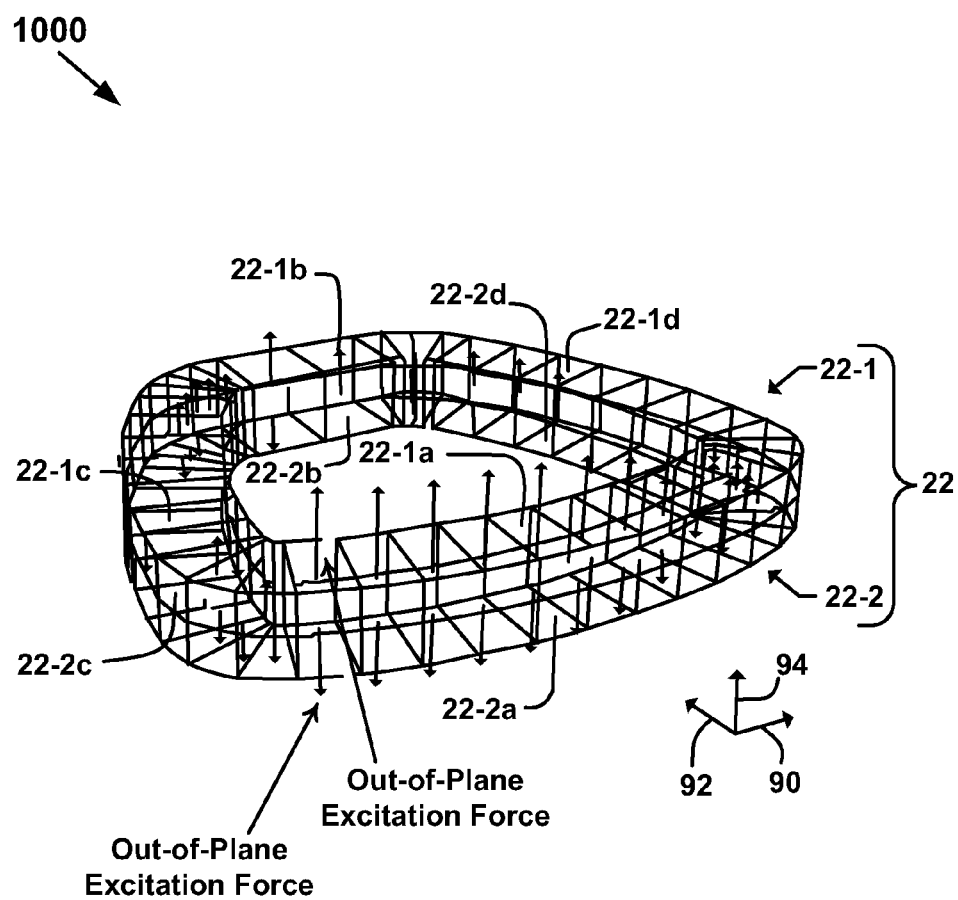
FIG. 10 is a perspective view of a wire-frame model of the voice-coil assembly, showing other out-of-plane excitation forces exerted on the FPC voice coil, shown as a first voice coil, and the second voice coil and that are suppressed, with relevance for embodiments of the present invention.

With reference now to FIG. 9, in accordance with embodiments of the present invention, a cross-sectional elevation view 900 is shown of an alternative example VCM 4. Triad of vectors 90, 92 and 94 indicates the orientation of the cross-sectional elevation view 900 with respect to the perspective view 100 of FIG. 1. The alternative example of the VCM 4 includes a FPC voice coil 22-1, a second voice coil 22-2 and a second FPC voice coil 22-3 of a voice-coil assembly 22, and first and second VCM magnets 42-1 and 42-2. As the FPC voice coil 22-1 may be referred to herein as the first voice coil, the second FPC voice coil 22-3 may be referred to herein as a third voice coil. As shown in FIG. 9, the FPC voice coil 22-1 is disposed on top of the second voice coil 22-2 and the second FPC voice coil 22-3 is disposed at the bottom of the second voice coil 22-2. Consequently, the FPC voice coil 22-1 is configured to overlay a portion of at least one leg of the second voice coil 22-2; and, the second FPC voice coil 22-3 is configured to underlay a portion of at least one leg of the second voice coil 22-2. Thus, the FPC voice-coil assembly 24 may further include, by way of example without limitation thereto, at least the second FPC voice coil 22-3. The second FPC voice coil 22-3 includes at least a second coil including at least one coil turn, and a flexible substrate coupled to the second coil to form a second flexible printed circuit. In accordance with embodiments of the present invention, turns of the FPC voice coil 22-1, turns of the second voice coil 22-2 and turns of the second FPC voice coil 22-3 are wound about axes that may be disposed about parallel to the pivot shaft 3 of the rotary actuator 2 in the HDD 101. The FPC voice coil 22-1, the second voice coil 22-2, and the second FPC voice coil 22-3 are configured such that if a first voice-coil current 25-1 is applied to the FPC voice coil 22-1, a second voice-coil current 25-2 is applied to the second voice coil 22-2, and a third voice-coil current 25-3 is applied to the second FPC voice coil 22-3, the first voice-coil current 25-1 and the third voice-coil current 25-3 can reduce a sum of a component of force acting on the FPC voice coil 22-1, a component of force acting on second voice coil 22-2 and a component of force acting on the second FPC voice coil 22-3 in a direction about parallel to the axes of the FPC voice coil 22-1, the second voice coil 22-2 and the second FPC voice coil 22-3. Thus, the FPC voice coil 22-1, the second voice coil 22-2, and the second FPC voice coil 22-3 are configured to suppress a torsional structural resonance of the FPC voice coil 22-1, second voice coil 22-2, and the second FPC voice coil 22-3 when data is accessed on the magnetic-recording disk 1 in the HDD 101.

With reference now to FIG. 10, with relevance for embodiments of the present invention, a perspective view 1000 is shown of a wire-frame model of the voice-coil assembly 22. FIG. 10 shows other out-of-plane excitation forces that may be exerted on the FPC voice coil 22-1 and the second voice coil 22-2, but that are suppressed, in accordance with embodiments of the present invention. Triad of vectors 90, 92 and 94 indicates the orientation of the perspective view 1000 with respect to the perspective view 100 of FIG. 1. As shown in FIG. 10, the voice-coil assembly 22 includes the FPC voice coil 22-1 and at least a second voice coil 22-2. However, in accordance with other embodiments of the present invention, a voice-coil assembly may further include a plurality of voice coils including the FPC voice coil 22-1, the second voice coil 22-2, and a third voice coil (not shown), for example, a second FPC voice coil 22-3 (FIG. 9); the plurality of voice coils are similarly configured to embodiments of the present invention for the FPC voice coil 22-1 and the second voice coil 22-2, described herein, to reduce vibrations of the magnetic-recording head 21 when data is accessed on the magnetic-recording disk 1 in the HDD 101. The FPC voice coil 22-1 includes the outer peripheral portion 22-1a, the inner peripheral portion 22-1b, the left straight-line portion 22-1c and the right straight-line portion 22-1d. The second voice coil 22-2 includes the outer peripheral portion 22-2a, the inner peripheral portion 22-2b, the left straight-line portion 22-2c and the right straight-line portion 22-2d. Moreover, in accordance with embodiments of the present invention, the form and the shape of the second voice coil 22-2 in the plane of the second voice coil 22-2 may be substantially identical to the form and the shape of the FPC voice coil 22-1 in the plane of the FPC voice coil 22-1; and, the FPC voice coil 22-1 may be disposed in close proximity to the second voice coil 22-2 such that the FPC voice coil 22-1 substantially overlays the second voice coil 22-2 to produce a voice-coil assembly 22 with the form and shape of a trapezoidal flattened annulus, without limitation thereto. In accordance with embodiments of the present invention, this configuration of the FPC voice coil 22-1 and the second voice coil 22-2 may provide for reduction of vibrations of the magnetic-recording head 21 when data is accessed on a magnetic-recording disk 1 in HDD 101, as is next described.

With further reference to FIG. 10, with relevance for embodiments of the present invention, the magnetic flux from the outer periphery of the VCM magnets 42-1 and 42-2 situated furthest away from the center of rotation of the rotary actuator 2 is not perpendicular to the plane of the coil. Therefore, out-of-plane excitation forces may be produced at the outer peripheral portions of the voice-coil assembly 22, for example, the outer peripheral portion 22-1a of FPC voice coil 22-1 and the outer peripheral portion 22-2a of second voice coil 22-2. Similarly, as shown in FIG. 10, out-of-plane excitation forces, but of substantially lesser magnitude as shown, may be produced at the inner peripheral portions of the voice-coil assembly 22, for example, the inner peripheral portion 22-1b of FPC voice coil 22-1 and the inner peripheral portion 22-2b of second voice coil 22-2. But for embodiments of the present invention, these out-of-plane excitation forces would become one cause of noise and settling vibration. Also as shown in FIG. 10, the orientations of the currents applied to the FPC voice coil 22-1 and the second voice coil 22-2 are the same. However, in accordance with embodiments of the present invention, the magnitudes of current applied to the FPC voice coil 22-1 and the second voice coil 22-2 are not equal; and, the proportions of the magnitudes of current for the FPC voice coil 22-1 and the second voice coil 22-2 may be adjusted in such a way that there is little excitation of structural resonance, such as bending and torsion. Thus, in accordance with embodiments of the present invention, the FPC voice coil 22-1 and the second voice coil 22-2 are configured such that if a first voice-coil current 25-1 is applied to the FPC voice coil 22-1, a second voice-coil current 25-2 that is applied to the second voice coil 22-2 can reduce a sum of a component of force acting on the FPC voice coil 22-1 and a component of force acting on second voice coil 22-2 in a direction about parallel to the axes of the FPC voice coil 22-1 and the second voice coil 22-2. Moreover, in accordance with embodiments of the present invention, the sum of the first voice-coil current 25-1 and the second voice-coil current 25-2 is constant over a total range of motion of the rotary actuator 2. In another embodiment of the present invention, the sum of the first voice-coil current 25-1 and the second voice-coil current 25-2 may be adjusted to provide uniform rotational motion over a total range of motion of the rotary actuator 2. In yet another embodiment of the present invention, the proportions of VCM current in the FPC voice coil 22-1 and the second voice coil 22-2 are adjusted to reduce structural resonances excited in the FPC voice coil 22-1 and the second voice coil 22-2. Thus, in accordance with embodiments of the present invention, the FPC voice coil 22-1 and the second voice coil 22-2 are configured to suppress a torsional structural resonance of the FPC voice coil 22-1 and the second voice coil 22-2 when data is accessed on the magnetic-recording disk 1 in HDD 101.

Figure 11:
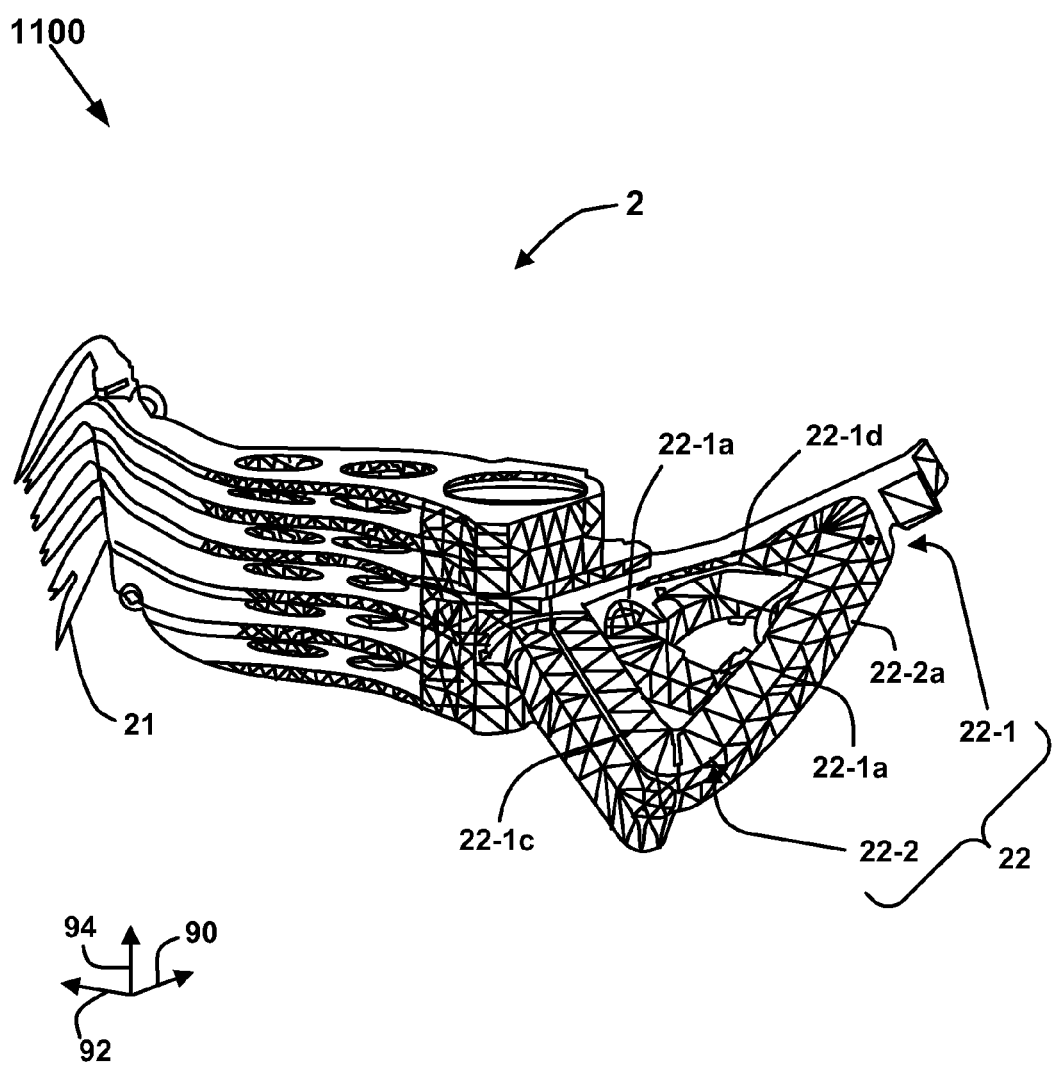
FIG. 11 is a perspective view of a polygonal-mesh model of a rotary actuator including the voice-coil assembly of FIG. 10, showing a shape change induced by a torsional structural resonance that is suppressed, with relevance for embodiments of the present invention.

With reference now to FIG. 11, with relevance for embodiments of the present invention, a perspective view 1100 is shown of a polygonal-mesh model of a rotary actuator 2 including the voice-coil assembly 22 of FIG. 10. FIG. 11 shows a shape change induced by the torsional structural resonance that is suppressed, in accordance with embodiments of the present invention. Triad of vectors 90, 92 and 94 indicates the orientation of the perspective view 1100 with respect to the perspective view 100 of FIG. 1. In accordance with embodiments of the present invention, the rotary actuator 2 is configured to reduce vibrations of the magnetic-recording head 21 when data is accessed on the magnetic-recording disk 1 in HDD 101. The rotary actuator 2 includes a voice-coil assembly 22. The voice-coil assembly includes a FPC voice coil 22-1 and at least a second voice coil 22-2. Because the bottom of the voice-coil assembly 22 is hidden from view, only the outer peripheral portion 22-2a of the FPC voice coil 22-1 is shown; but, the outer peripheral portion 22-1a, the inner peripheral portion 22-1b, the left straight-line portion 22-1c and the right straight-line portion 22-1d of the FPC voice coil 22-1 are shown in FIG. 11. The second voice coil 22-2 is disposed in close proximity to the FPC voice coil 22-1 such that the FPC voice coil 22-1 substantially overlays the second voice coil 22-2; and, the head is coupled with the rotary actuator 2 at a distal end of the rotary actuator 2, as previously described. The FPC voice coil 22-1 and the second voice coil 22-2 are disposed at a proximal end of the rotary actuator 2 opposite to the distal end. In accordance with embodiments of the present invention, the FPC voice coil 22-1 and the second voice coil 22-2 are configured to reduce vibrations of the magnetic-recording head 21 when data is accessed on the magnetic-recording disk 1 in HDD 101.

With further reference to FIG. 11, with relevance for embodiments of the present invention, if the out-of-plane excitation force exerted on the FPC voice coil 22-1 is greater than that exerted on the second voice coil 22-2, the magnitude of the first voice-coil current 25-1 may be made less than the magnitude of the second voice-coil current 25-2, such that the torsional moment exerted on the FPC voice coil 22-1 and the second voice coil 22-2 is reduced in accordance with embodiments of the present invention. The proportions of the magnitudes of first and second voice-coil currents 25-1 and 25-2 applied to the FPC voice coil 22-1 and the second voice coil 22-2 may be adjusted in such a way that there is little excitation of a torsional structural resonance mode, which is shown in FIG. 11 for purposes of illustration. In accordance with embodiments of the present invention, the excitation of a torsional structural resonance mode may be reduced over the entire range of movement of the voice-coil assembly 22. Moreover, in yet other embodiments of the present invention, variations in the proportions of the magnitudes of first and second voice-coil currents 25-1 and 25-2 applied to the FPC voice coil 22-1 and the second voice coil 22-2 may be adjusted depending on the position of the magnetic-recording head 21; and, these variations in the proportions of the magnitudes of first and second voice-coil currents 25-1 and 25-2 that depend on the position of the magnetic-recording head 21 may be saved by, or alternatively retrieved by, a HDC as control data, which are table values in a memory configured to provide a look-up table containing the control data. Furthermore, in yet another embodiment of the present invention, the sum of the magnitudes of the first and second voice-coil currents 25-1 and 25-2 applied to the FPC voice coil 22-1 and the second voice coil 22-2 is constant for the range of movement of the FPC voice coil 22-1 and the second voice coil 22-2. Moreover, in yet another embodiment of the present invention, if the sum of the magnitudes of the first and second voice-coil currents 25-1 and 25-2 applied to the FPC voice coil 22-1 and the second voice coil 22-2 is constant over the range of movement of the FPC voice coil 22-1 and the second voice coil 22-2, uniform rotational moment of the rotary actuator 2 may be achieved over the range of movement. By way of example, in accordance with embodiments of the present invention, the FPC voice coil 22-1 and the second voice coil 22-2 may have the same form and shape in the respective planes of the FPC voice coil 22-1 and the second voice coil 22-2, without limitation thereto; but, embodiments of the present invention also include within their spirit and scope FPC voice coil 22-1 and the second voice coil 22-2 having different shapes. A method for adjusting the proportions of VCM current applied to the FPC voice coil 22-1 and the second voice coil 22-2 are next described.

Figure 12:
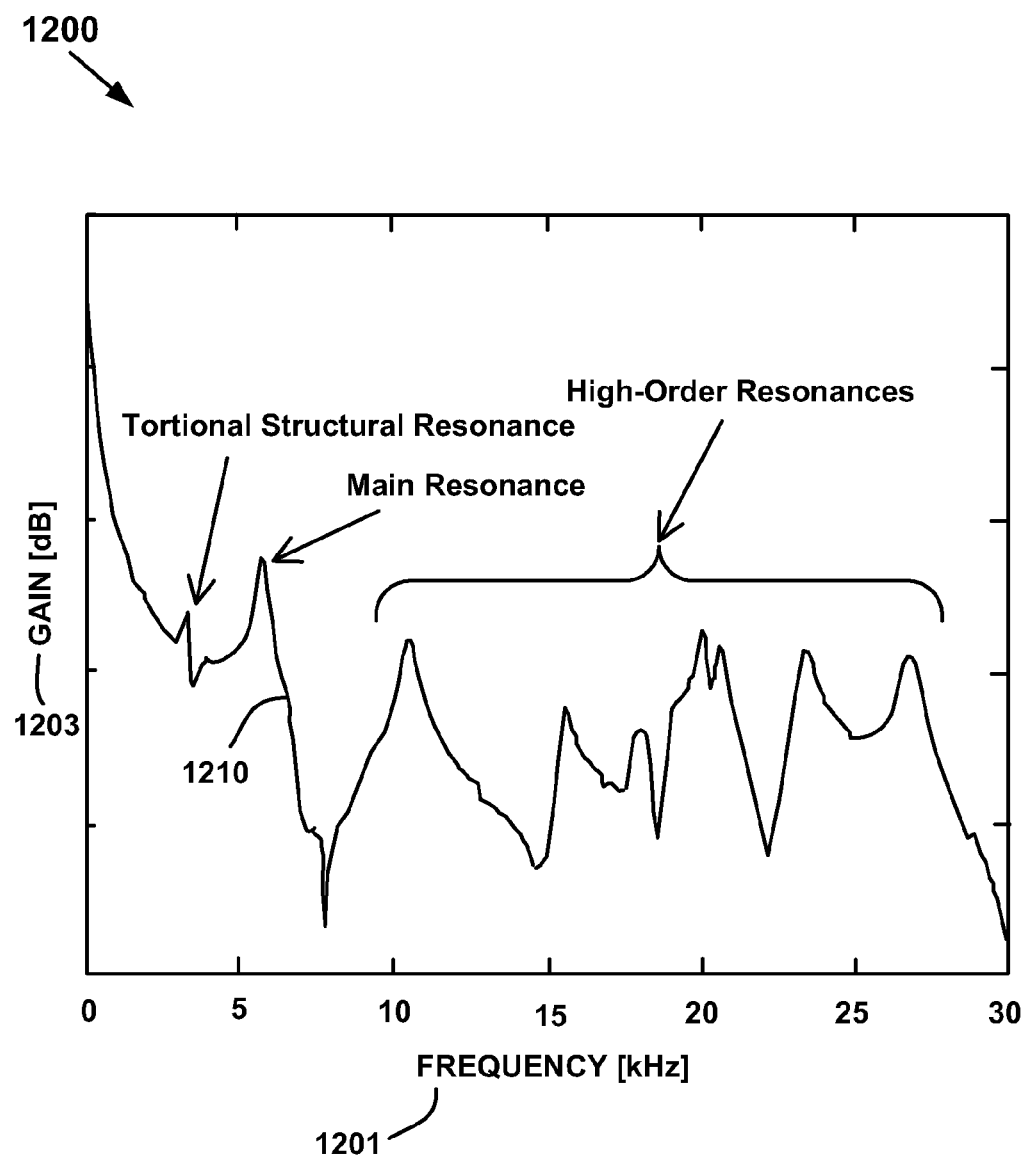
FIG. 12 is a plot of a transfer function for magnetic-recording-head displacement as a function of frequency response of the rotary actuator to the applied VCM current that is used for determining values of modal participation factors of the FPC voice coil and the second voice coil and for suppression of the torsional structural resonance, in accordance with one or more embodiments of the present invention.

With reference now to FIG. 12, in accordance with embodiments of the present invention, a plot 1200 is shown of a transfer function 1210 for magnetic-recording-head displacement as a function of frequency response of the rotary actuator 2 to the applied VCM current. The ordinate of the plot 1200 of the transfer function 1210 is gain 1203 in decibels (dB); and, the abscissa, frequency 1201 in kilohertz (kHz). The transfer function exhibits a torsional structural resonance, a main resonance, and higher order resonances appearing in the magnetic-recording-head displacement. The transfer function is used for determining values of modal participation factors of the FPC voice coil 22-1 and the second voice coil 22-2, for suppression of the torsional structural resonance. FIG. 12 shows the transfer function from the VCM current to the magnetic-recording head 21. In accordance with embodiments of the present invention, modal participation factors that are excited by the respective voice coils 22-1 and 22-2 may be obtained by applying a constant test current separately to the FPC voice coil 22-1 and the second voice coil 22-2 at the frequency of the torsional structural resonance in the transfer function. The modal participations factors for the first coil and second voice coils are denoted by, $\alpha$, and $\beta$, respectively; but, the proportions of magnitudes of VCM current flowing to the FPC voice coil 22-1 and the second voice coil 22-2 are the opposite, being: $\beta$ and $\alpha$, respectively. Furthermore, if the sum of $\alpha$ and $\beta$ is constant in the range of movement of the rotary actuator 2, the rotational moment in the range of movement can be kept constant. By adjusting these voice-coil current values, the excitation of torsional structural resonance is reduced and stable control of the movement of rotary actuator 2 may be provided.

With further reference to FIGS. 1 and 12, in accordance with embodiments of the present invention, the HDD 101 may further include a HDC and a memory configured to provide a look-up table. The HDC is configured to retrieve control data from the look-up table used to adjust the first voice-coil current 25-1 applied to the FPC voice coil 22-1 to a first proportion of VCM current and to adjust the second voice-coil current 25-2 applied to the second voice coil 22-2 to a second proportion of VCM current to reduce torsional moments on the FPC voice coil 22-1 and the second voice coil 22-2. In accordance with embodiments of the present invention, the control data includes a first modal participation factor, $\alpha$, associated with the FPC voice coil 22-1, and a second modal participation factor, $\beta$, associated with the second voice coil 22-2. The first modal participation factor, $\alpha$, is determined by a first percentage contribution to amplitude of a torsional structural resonance of the FPC voice coil 22-1 and the second voice coil 22-2 upon applying a first test current of a given amplitude to the FPC voice coil 22-1 at a resonant frequency associated with the torsional structural resonance. Similarly, the second modal participation factor, $\beta$, is determined by a second percentage contribution to the amplitude of the torsional structural resonance of the FPC voice coil 22-1 and the second voice coil 22-2 upon applying a second test current of a given amplitude to the second voice coil 22-2 at the resonant frequency associated with the torsional structural resonance. In accordance with embodiments of the present invention, the HDC is configured to adjust the first proportion of VCM current in proportion to a value given by the second modal participation factor, $\beta$, and to adjust the second proportion of VCM current in proportion to a value given by the first modal participation factor, $\alpha$. In accordance with embodiments of the present invention, the sum of the first proportion of VCM current and the second proportion of VCM current is constant over a total range of movement of the rotary actuator 2.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A voice-coil motor, comprising:
    at least one voice-coil-motor magnet; and
    a voice-coil assembly comprising:
        a FPC voice-coil assembly comprising:
            at least one FPC voice coil comprising:
                a coil comprising at least one coil turn; and
                a flexible substrate coupled to said coil to form a flexible printed circuit;
            wherein said FPC voice coil is disposed in proximity to a magnetic pole of said voice-coil-motor magnet; and
        at least a second voice coil disposed in close proximity to said FPC voice coil such that said FPC voice coil is disposed as a laminate coupled with a first side of said second voice coil, said first side about perpendicular to an axis about which turns of said second voice coil are wound;
    wherein said FPC voice coil and said second voice coil are configured to reduce vibrations of a head when data is accessed on a disk in a disk drive.

2. The voice-coil motor of claim 1, wherein said wherein said at least one FPC voice coil comprises a planar coil.

3. The voice-coil motor of claim 1, wherein turns of said FPC voice coil and turns of said second voice coil are wound about an axis that may be disposed about parallel to a pivot shaft of a rotary actuator in said disk drive; and
    wherein said FPC voice coil and said second voice coil are configured such that if a first voice-coil current is applied to said FPC voice coil, a second voice-coil current that is applied to said second voice coil can reduce a sum of a component of force acting on said FPC voice coil and a component of force acting on second voice coil in a direction about parallel to said axes of said FPC voice coil and said second voice coil.

4. The voice-coil motor of claim 1, wherein said FPC voice coil and said second voice coil are configured to suppress a torsional structural resonance of said FPC voice coil and said second voice coil when data is accessed on a disk in said disk drive.

5. The voice-coil motor of claim 1, wherein said FPC voice-coil assembly further comprises:
    at least a second FPC voice coil comprising:
        at least a second coil comprising at least one coil turn; and
        a flexible substrate coupled to said second coil to form a second flexible printed circuit;
        wherein said second FPC voice coil is disposed as a laminate coupled with a second side of said second voice coil, said second side opposite to said first side of said second voice coil.

6. The voice-coil motor of claim 5, wherein said wherein said FPC voice coil is configured to overlay a portion of at least one leg of said second voice coil; and
    wherein said second FPC voice coil is configured to underlay a portion of at least one leg of said second voice coil.

7. The voice-coil motor of claim 5, wherein turns of said FPC voice coil, turns of said second voice coil and turns of said second FPC voice coil are wound about axes that may be disposed about parallel to a pivot shaft of a rotary actuator in said disk drive; and
    wherein said FPC voice coil, said second voice coil, and said second FPC voice coil are configured such that if a first voice-coil current is applied to said FPC voice coil, a second voice-coil current is applied to said second voice coil, and a third voice-coil current is applied to said second FPC voice coil, said first voice-coil current and said third voice-coil current can reduce a sum of a component of force acting on said FPC voice coil, a component of force acting on second voice coil and a component of force acting on said second FPC voice coil in a direction about parallel to said axes of said FPC voice coil, said second voice coil and said second FPC voice coil.

8. The voice-coil motor of claim 5, wherein said FPC voice coil, said second voice coil, and said second FPC voice coil are configured to suppress a torsional structural resonance of said FPC voice coil, said second voice coil, and said second FPC voice coil when data is accessed on a disk in said disk drive.

9. A disk drive, comprising:
   at least one head;
   at least one disk rotatably mounted in said disk drive;
   a rotary actuator coupled with said head at a distal end of said rotary actuator;
      wherein said rotary actuator is configured to move said head to access portions of said disk for writing data to, and reading data from, said disk; and
   a voice-coil motor, comprising:
      at least one voice-coil-motor magnet; and
      a voice-coil assembly comprising:
         a FPC voice-coil assembly comprising:
            at least one FPC voice coil comprising:
            a coil comprising at least one coil turn;
            a flexible substrate coupled to said coil to form a flexible printed circuit; and
            a flexible cable, said flexible cable coupled with said FPC voice coil, configured to provide electrical current flow to at least one FPC voice coil of said FPC voice-coil assembly;
            wherein said FPC voice coil is disposed in proximity to a magnetic pole of said voice-coil-motor magnet; and
         at least a second voice coil disposed in close proximity to said FPC voice coil such that said FPC voice coil is disposed as a laminate coupled with a first side of said second voice coil, said first side about perpendicular to an axis about which turns of said second voice coil are wound;
         wherein said FPC voice coil and said second voice coil are disposed at a proximal end of said rotary actuator opposite to said distal end, and are configured to reduce vibrations of said head when data is accessed on said disk in said disk drive.

10. The disk drive of claim 9, wherein said FPC voice coil is configured to overlay a portion of at least one leg of said second voice coil of said voice-coil motor.

11. The disk drive of claim 9, wherein said FPC voice coil is configured to underlay a portion of at least one leg of said second voice coil of said voice-coil motor.

12. The disk drive of claim 9, wherein said FPC voice-coil assembly further comprises:
   at least a second FPC voice coil comprising:
      at least a second coil comprising at least one coil turn; and
      a flexible substrate coupled to said second coil to form a second flexible printed circuit;
      wherein said second FPC voice coil is disposed as a laminate coupled with a second side of said second voice coil, said second side opposite to said first side of said second voice coil; and
   wherein said wherein said FPC voice coil is configured to overlay a portion of at least one leg of said second voice coil; and
   wherein said second FPC voice coil is configured to underlay a portion of at least one leg of said second voice coil.

13. The disk drive of claim 12, wherein at least one of said first and said second FPC voice coils and is configured to suppress a torsional structural resonance of said rotary actuator when data is accessed on a disk in said disk drive.

* * * * *